United States Patent
Scheerer et al.

(10) Patent No.: US 9,280,444 B2
(45) Date of Patent: Mar. 8, 2016

(54) SYSTEM AND METHOD FOR IDENTIFYING CONTENTION OF SHARED RESOURCES IN A RUNTIME SYSTEM

(75) Inventors: Johannes Scheerer, Heidelberg (DE); Ralf Schmelter, Wiesloch (DE); Michael Wintergerst, Muelhausen (DE); Steffen Schreiber, Frankenthal (DE); Dietrich Mostowoj, Ludwigshafen (DE)

(73) Assignee: SAP SE, Walldorf (DE)

( * ) Notice: Subject to any disclaimer, the term of this patent is extended or adjusted under 35 U.S.C. 154(b) by 387 days.

(21) Appl. No.: 12/901,907

(22) Filed: Oct. 11, 2010

(65) Prior Publication Data

US 2012/0089991 A1  Apr. 12, 2012

(51) Int. Cl.
| | |
|---|---|
| G06F 9/44 | (2006.01) |
| G06F 11/36 | (2006.01) |
| G06F 11/32 | (2006.01) |
| G06F 9/52 | (2006.01) |
| G06F 12/02 | (2006.01) |

(52) U.S. Cl.
CPC .......... G06F 11/3632 (2013.01); G06F 11/323 (2013.01); *G06F 9/52* (2013.01); *G06F 11/3664* (2013.01); *G06F 12/0269* (2013.01)

(58) Field of Classification Search
CPC .................................................. G06F 11/3632
See application file for complete search history.

(56) References Cited

U.S. PATENT DOCUMENTS

| | | | |
|---|---|---|---|
| 5,931,923 A | | 8/1999 | Roberts |
| 6,681,241 B1 * | | 1/2004 | Fagen et al. ................ 718/104 |
| 6,691,304 B1 | | 2/2004 | Zhang et al. |
| 6,912,553 B1 * | | 6/2005 | Kolodner et al. |
| 6,952,825 B1 | | 10/2005 | Cockx et al. |
| 8,117,600 B1 | | 2/2012 | Roeck et al. |
| 9,141,439 B2 | | 9/2015 | Scheerer et al. |
| 2004/0024797 A1 * | | 2/2004 | Berry et al. ................ 707/206 |
| 2005/0010729 A1 | | 1/2005 | Silvera et al. |
| 2006/0010444 A1 * | | 1/2006 | Seidman et al. ............ 718/100 |
| 2006/0085426 A1 | | 4/2006 | Verma et al. |
| 2007/0067777 A1 * | | 3/2007 | Branda et al. .............. 718/107 |

(Continued)

OTHER PUBLICATIONS

Investigating Throughput Degradation Behavior of Java Application Servers: A View from Inside a Virtual Machine Feng Xian, Witawas Srisaan, Hong Jiang Published: 2006.*

(Continued)

*Primary Examiner* — Dong Kim
*Assistant Examiner* — Paul Mills
(74) *Attorney, Agent, or Firm* — Schwegman Lundberg & Woessner, P.A.

(57) ABSTRACT

A system and computer-implemented method for determining a runtime of a thread of an application. Synchronization events for a first thread of an application executing on the computer system are received, the synchronization events including at least a first synchronization event and a second synchronization event for the first thread. A first difference between a synchronization event timestamp of the first synchronization event and the synchronization event timestamp of the second synchronization event is calculated. A second difference between an accumulated timestamp of the first synchronization event and the accumulated timestamp of the second synchronization event is calculated. A runtime of the first thread of the application is calculated as a difference between the first difference and the second difference.

21 Claims, 20 Drawing Sheets

(56) References Cited

U.S. PATENT DOCUMENTS

2011/0225592 A1* 9/2011 Goldin .................. 718/104
2012/0089990 A1 4/2012 Scheerer et al.

OTHER PUBLICATIONS

Kendo: Efficient Deterministic Multithreading in Software Marek Olszewski, Jason Ansel, Saman Amarasinghe Published: Mar. 2009.*
Efficient Execution Replay for Athapascan-0 parallel programs J. Chassin de Kergommeaux, M. Ronsse, K. De Bosschere Published: 1999.*
Performance Monitoring of Java Applications Marcel Harkema, Dick Quartel, Rob van der Mei, Bart Gijsen Published: 2002.*
A Java Performance Monitoring Tool Marcel Harkema, Dick Quartel, Rob van der Mei, Bart Gijsen Published: 2002.*
TIV: Thread Interaction Visualizer Kevin Forbes Audleman, David Laidlaw, Steven Reiss, Shriram Krishnamurthi Published: 2002.*
Borland Optimizeit 6: Thread Debugger 1.4 User's Guide Borland Chapters 1 and 4-6, retrieved from: http://techpubs.borland.com/optimizeit/index.html Published: 2003.*
JRastro: A Trace Agent for Debugging Multithreaded and Distributed Java Programs Gabriela Jacques da Silva, Lucas Mello Schnorr, Benhur de Oliveira Stein Published: 2003.*
Performance Monitoring and Visualization of Large-Sized and Multi-Threaded Applications with the Pajé Framework Mehdi Kessis, Jean-Marc Vincent Published: 2006.*
Controlled Dynamic Performance Analysis Steven P. Reiss Published: 2008.*
Concurrent Object-Oriented Programming a Visualization Challenge Hendra Widjaja and Michael Oudshoorn Published: 1997.*
"Introduction to Profiling Java Applications in BetBeans IDS", [Online]. Retrieved from the Internet: <URL: http://netbeans.org/kb/docs/java/profiler-intro.html>, (Accessed Aug. 5, 2010), 9 pgs.
"YourKit Java Prifiler Features", [Online]. Retrieved from the Internet: <URL: http://www.yourkit.com/features/index.jsp>, (Apr. 30, 2010), 28 pgs.
"U.S. Appl. No. 12/901,899, Non Final Office Action mailed Oct. 15, 2012", 16 pgs.
"U.S. Appl. No. 12/901,899, Response filed Feb. 15, 2013 to Non Final Office Action mailed Oct. 15, 2012", 13 pgs.
"U.S. Appl. No. 12/901,899, Final Office Action mailed Apr. 25, 2013", 17 pgs.
"U.S. Appl. No. 12/901,899, Response filed Jul. 22, 2013 to Final Office Action mailed Apr. 25, 2013", 14 pgs.
"U.S. Appl. No. 12/901,899, Non Final Office Action mailed Jun. 5, 2014", 18 pgs.
"U.S. Appl. No. 12/901,899, Examiner Interview Summary mailed Sep. 25, 2014", 3 pgs.
"U.S. Appl. No. 12/901,899, Final Office Action mailed Dec. 24, 2014", 20 pgs.
"U.S. Appl. No. 12/901,899, Response filed Oct. 6, 2014 to Non Final Office Action mailed Jun. 6, 2014", 12 pgs.
"U.S. Appl. No. 12/901,899, Notice of Allowance mailed Jul. 27, 2015", 14 pgs.
"U.S. Appl. No. 12/901,899, Response Filed Apr. 29, 2015 to Final Office Action mailed Dec. 24, 2014", 14 pgs.

* cited by examiner

7. Release Use

SYSTEM AND METHOD FOR IDENTIFYING CONTENTION OF SHARED RESOURCES IN A RUNTIME SYSTEM

TECHNICAL FIELD

The disclosed embodiments relate generally to identifying contention of shared resources in a runtime system.

BACKGROUND

Many processors include multiple processing cores. In order to take advantage of the multiple processing cores of a processor, programmers write multi-threaded applications in which multiple threads of an application are distributed across the processing cores of the processor and executed substantially simultaneously by the cores of the processor. The resources of the processor (e.g., cache memory) are typically shared between the threads of the application. Accordingly, a first thread of the application may attempt to use the same resource as a second thread of the application. In order to maintain consistency of the shared resources, only one thread is allowed to use a shared resource at any given time. All other threads are blocked from using the shared resource and must wait for their turn to use the shared resource. As a result, deadlocks and/or performance bottlenecks may occur because only a subset of the threads can execute in parallel while the other threads wait for the shared resources to become free.

BRIEF DESCRIPTION OF THE DRAWINGS

Like reference numerals refer to corresponding parts throughout the drawings.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for evaluating synchronization traces of contended synchronization primitives in a runtime environment that can execute multi-threaded applications. These embodiments may be used to determine which software components, methods, and/or threads block other software components, methods, and/or threads from running due to contention of synchronization primitives that guard shared resources. The embodiments described herein also provide information about the contention of synchronization primitives between software components.

Some embodiments provide a user interface that allows a user to analyze thread synchronization problems by showing the threads that are contending for use of share resources. In some embodiments, the user interface allows the user to analyze critical sections at a method and software component level. In some embodiments, the user interface provides summaries and detailed information about contention of shared resources.

Figure 1A:
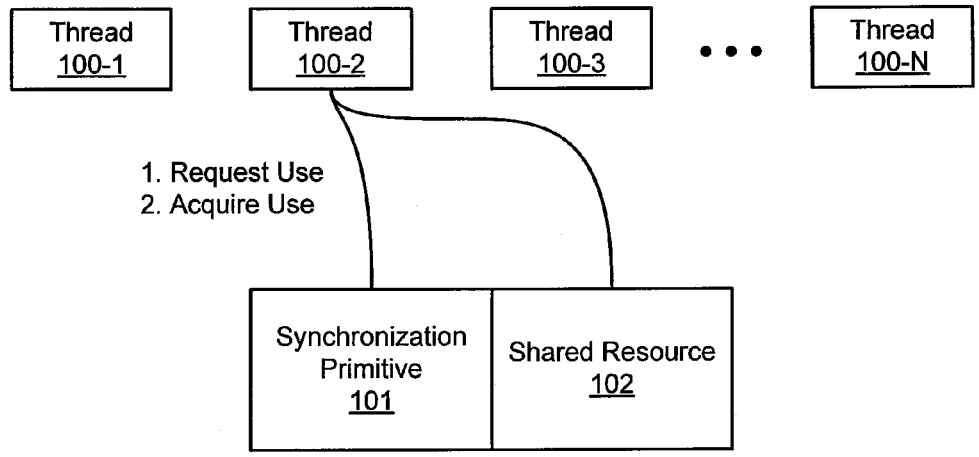
FIG. 1A is a block diagram illustrating a first thread of a multi-threaded application acquiring use of a synchronization primitive for a shared resource, according to some embodiments.

FIGS. 1A-1E are block diagrams illustrating threads 100-1, 100-2, 100-3, . . . 100-N of a multi-threaded application that are requesting use of the same shared resource, according to some embodiments. The specification refers to threads of a multi-threaded application executing on a processor. However, it should be understood that the embodiments described herein apply generally to threads of a multi-threaded application being executed on a processor that uses shared resources (e.g., shared memory). For example, the embodiments described herein may apply to threads of a multi-threaded application being executed on a single core of a processor, on multiple processors, on multiple cores of a processor, and/or on multiple cores of multiple processors. In FIG. 1A, a thread 100-2 requires use of a shared resource 102. For example, the thread 100-2 may need to use a shared variable stored within the shared resource 102. The code executed by the thread 100-2 that requires use of the shared resource 102 is typically referred to as "a critical section" of code. In order for the thread 100-2 to use the shared resource 102, the thread 100-2 first requests use of a synchronization primitive 101 that guards the shared resource 102. In some embodiments, a synchronization primitive includes, but is not limited to, a mutex, an object monitor, a lock, a cyclic barrier, and a latch. Note that other types of synchronization primitives may be monitored by the embodiments described herein. In this example, the synchronization primitive 101 is not being used by other threads and the thread 100-2 acquires use of the synchronization primitive 101. Accordingly, the thread 100-2 now has exclusive use of the shared resource 102.

Figure 1B:
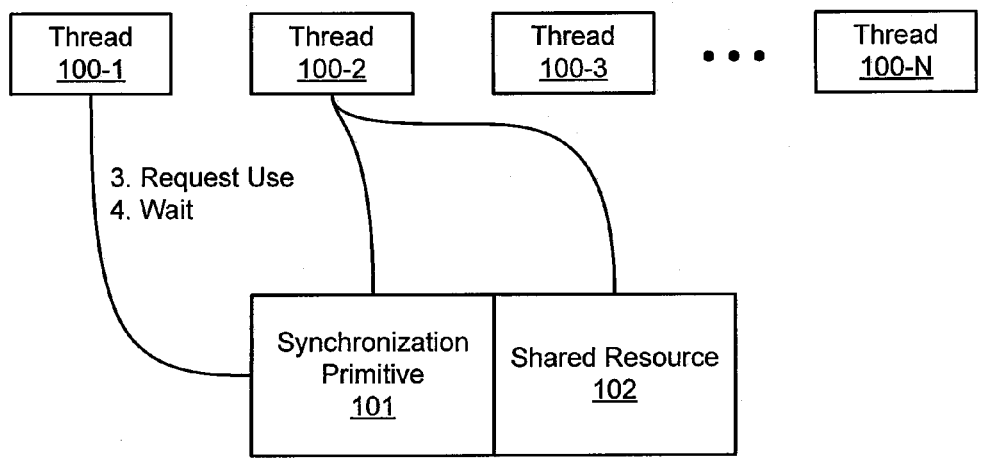
FIG. 1B is a block diagram illustrating a second thread of the multi-threaded application attempting to acquire use of the synchronization primitive for the shared resource, according to some embodiments.

In FIG. 1B, the thread 100-1 requires use of the shared resource 102 and requests use of the synchronization primitive 101. Since the thread 100-2 has not released use of the synchronization primitive 101, the thread 100-1 must wait (e.g., idle) until the thread 100-2 has released use of the synchronization primitive 101.

Figure 1C:
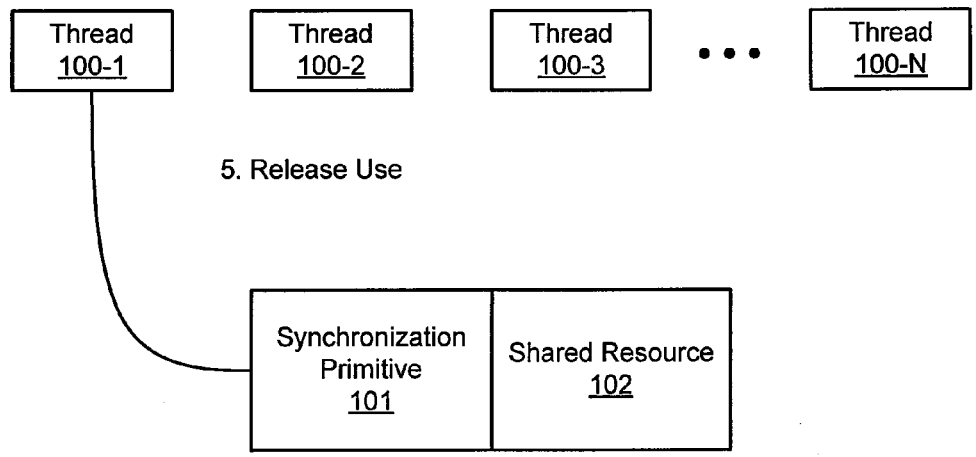
FIG. 1C is a block diagram illustrating the first thread of the multi-threaded application releasing use of the synchronization primitive for the shared resource, according to some embodiments.

In FIG. 1C, the thread 100-2 releases use of the synchronization primitive 101. Accordingly, the thread 100-2 no longer has exclusive use of the shared resource 102.

Figure 1D:
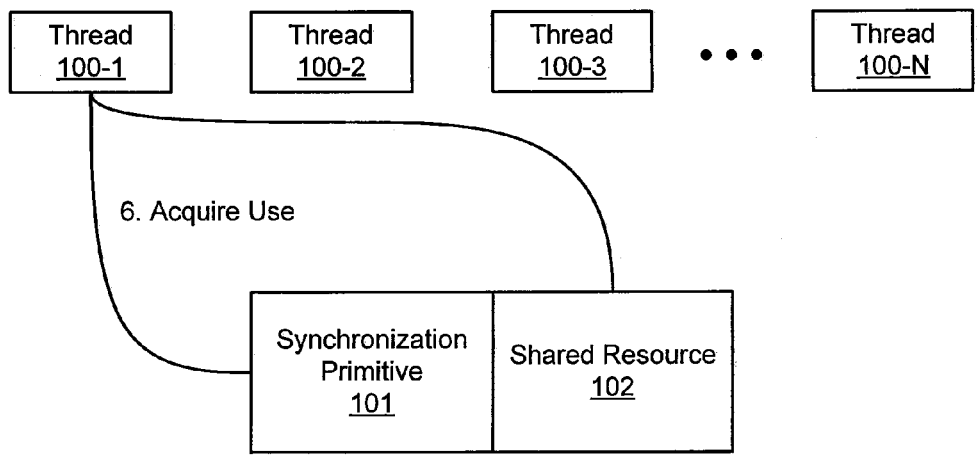
FIG. 1D is a block diagram illustrating the second thread of the multi-threaded application acquiring use of the synchronization primitive for the shared resource, according to some embodiments.

In FIG. 1D, since the thread 100-2 has released use of the synchronization primitive 101, the thread 100-1 acquires use of the synchronization primitive 101. Accordingly, the thread 100-1 now has exclusive use of the shared resource 102.

Figure 1E:
FIG. 1E is a block diagram illustrating the second thread of the multi-threaded application releasing use of the synchronization primitive for the shared resource, according to some embodiments.
Figure 1E:
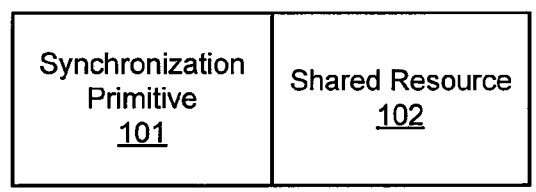

In FIG. 1E, the thread 100-1 releases use of the synchronization primitive 101.

Note that requesting, acquiring, and releasing use of a synchronization primitive are each referred to as a synchronization operation herein. In some embodiments, a synchronization event is emitted to a synchronization trace when a thread performs a synchronization operation involving a synchronization primitive.

In some embodiments, a synchronization primitive is used to guard a shared resource. In these embodiments, the synchronization operation may be an operation that requests use of the synchronization primitive and the corresponding synchronization event is an enter event corresponding to a time when the thread attempts to enter a critical section by requesting use of a synchronization primitive. The synchronization operation may also be an operation that acquires use of a synchronization primitive and the corresponding synchronization event is an entered event corresponding to a time when the thread enters the critical section by acquiring use of the synchronization primitive. The synchronization operation may also be an operation that releases use of a synchronization primitive and the corresponding synchronization event is an exit event corresponding to a time when the thread exits the critical section by releasing use of the synchronization primitive.

In some embodiments, a synchronization primitive is used to notify threads of changed conditions. In these embodiments, the synchronization operation may be an operation that waits for a change in a state of the synchronization primitive and the corresponding synchronization event is a wait event corresponding to a time when the thread starts waiting for a change in a state of the synchronization primitive. The synchronization operation may also be an operation that stops waiting for a change in the state of the synchronization primitive and the corresponding synchronization event is a waited event corresponding to a time when the thread has finished waiting for the change in the state of the synchronization primitive. The synchronization operation may also be an operation that notifies at least one other thread that the state of the synchronization primitive has changed and the corresponding synchronization event is a notify event corresponding to a time when the thread attempts to notify at least one other thread that the state of the synchronization primitive has changed.

Synchronization primitives that are used to notify threads of change conditions (e.g., java.lang.Object.wait( ) and java.lang.Object.notify( ) for JAVA), usually provide a mechanism to limit the amount of time a thread waits before the thread continues execution. Therefore, wait events include the deadline of the waiting period. To distinguish between the possible outcomes when a synchronization primitive is used for notification, a waited event may include one of the following exit types:

Notified: used when the current thread received a notification of a changed condition from another thread;

Timed Out: used when the provided deadline was exceeded without the current thread receiving a notification of a changed condition from another thread;

Interrupted: used when the current thread is interrupted, while waiting for a notification, via an interrupt mechanism of the runtime environment (e.g., java.lang.Thread.interrupt( ) for the JAVA); and Spurious Wakeup: used when the current thread incorrectly perceives a notification and/or a wakeup call from another thread when the other thread did not notify and/or wake up the current thread.

Notify events may also include additional thread identifiers. For example, the additional thread identifiers may include thread identifiers for threads that the current thread notified. Depending on the synchronization primitive, the number of threads may be: zero (e.g., no thread was notified because no thread was waiting for a changed condition), one (e.g., exactly one thread was notified of a changed condition), or several (e.g., more than one thread was notified of a changed condition).

In some embodiments, the runtime environment provides monitoring functions to monitor synchronization primitives. Whereas third-party application programming interfaces (APIs) allow a programmer to monitor system calls corresponding to synchronization operations (e.g., a wait( ) call), the monitoring functions of the runtime environment also allow a programmer to obtain information about the synchronization primitives themselves. Since these monitoring functions are provided by the runtime environment, the monitoring functions may also include more information about the contention of synchronization primitives and/or shared resources that are not available with third-party APIs. For example, the monitoring functions may include an accumulated timestamp that can be used to identify the accumulated amount of time that the processor spent performing the runtime environment functions and/or a synchronization primitive enumerator that allows the runtime system to correctly order the sequence of synchronization events.

The monitoring functions of the runtime system emit synchronization events to a synchronization trace in response to detecting synchronization operations performed by threads executing in the runtime system. In some embodiments, the synchronization events emitted to the synchronization trace are used by a synchronization user interface module to display synchronization information relating to contention of synchronization primitives and/or shared resources in the runtime system. Each synchronization event may include, but is not limited to, a synchronization event timestamp corresponding to a time at which a synchronization event was emitted to the synchronization trace, an accumulated timestamp corresponding to the accumulated amount of time that the processor spent performing the runtime environment functions at the time that the synchronization event was emitted to the synchronization trace, a value of a synchronization primitive enumerator for the synchronization primitive corresponding to the synchronization event at the time that the synchronization operation was performed, an identifier for a thread corresponding to the synchronization event, an identifier for a current thread that has acquired use of a synchronization primitive that the thread corresponding to the synchronization event requires, an identifier for a next thread that will acquire use of the synchronization primitive that the thread corresponding to the synchronization event requires, and a maximum amount of time that the thread may wait to acquire use of the synchronization primitive. Using the synchronization event timestamp, the accumulated timestamp, and the synchronization primitive enumerator, the synchronization user interface module may display information including, but not limited to, a list of threads that a first thread blocks, an amount of time that the first thread blocks each of the threads in the list of threads, a number of times that the first thread blocks each of the threads in the list of threads, a list of threads blocking a first thread, an amount of time that each of the threads in the list of threads blocks the first thread, a number of times that each of the threads in the list of threads blocks the first thread, a list of threads that a synchronization primitive blocks, an amount of time that the synchronization primitive blocks each thread in the list of threads, a number of times that the synchronization primitive blocks each thread in the list of threads, a list of methods blocking a first method, an amount of time that each of the methods in the list of methods blocks the first method, and a number of times that each of the methods in the list of methods blocks the first method.

Figure 2A:
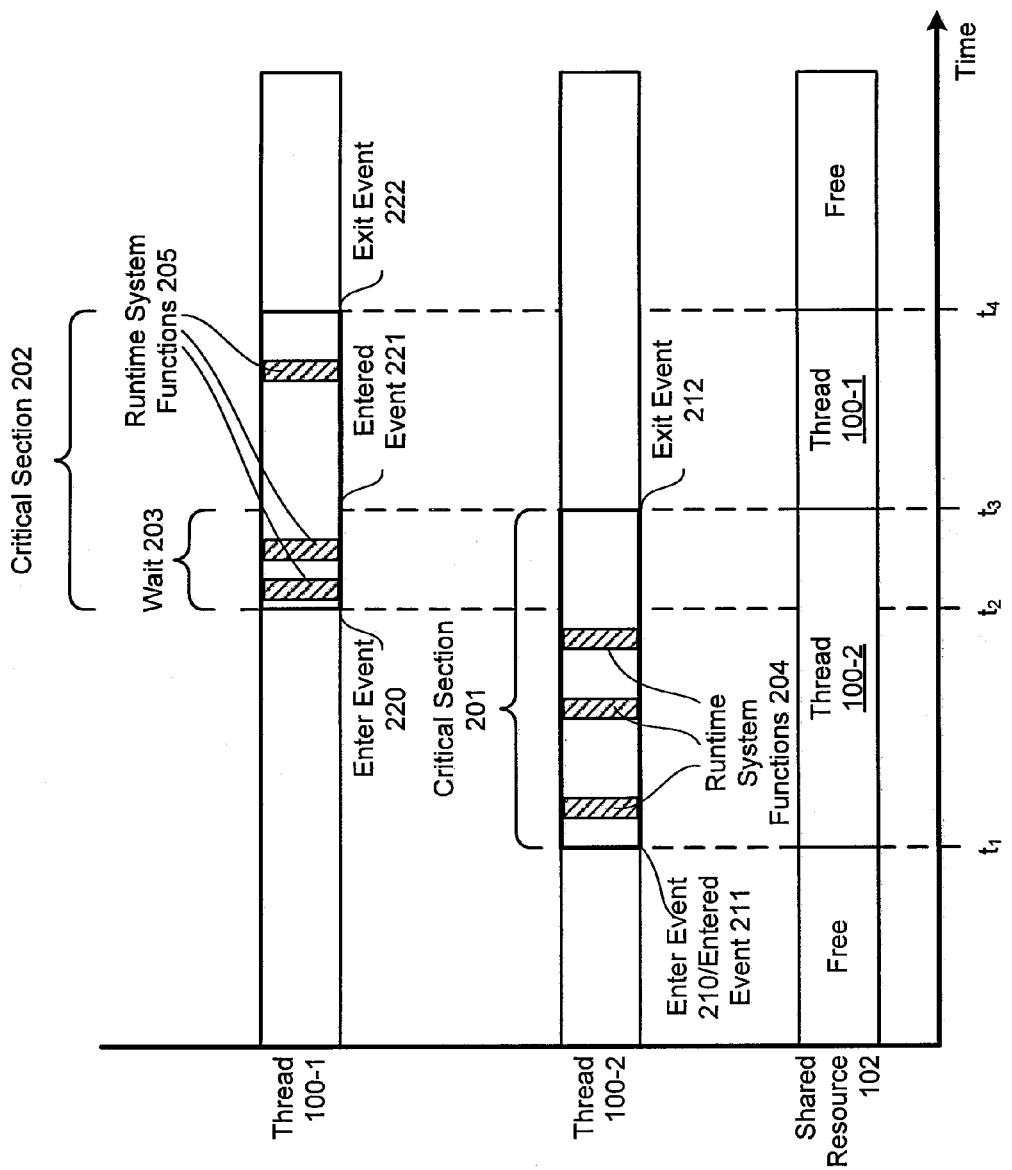
FIG. 2A is a timing diagram illustrating the calculation of a time in which a first thread of a multi-threaded application is blocked by a second thread of the multi-threaded application, according to some embodiments.
Figure 2B:
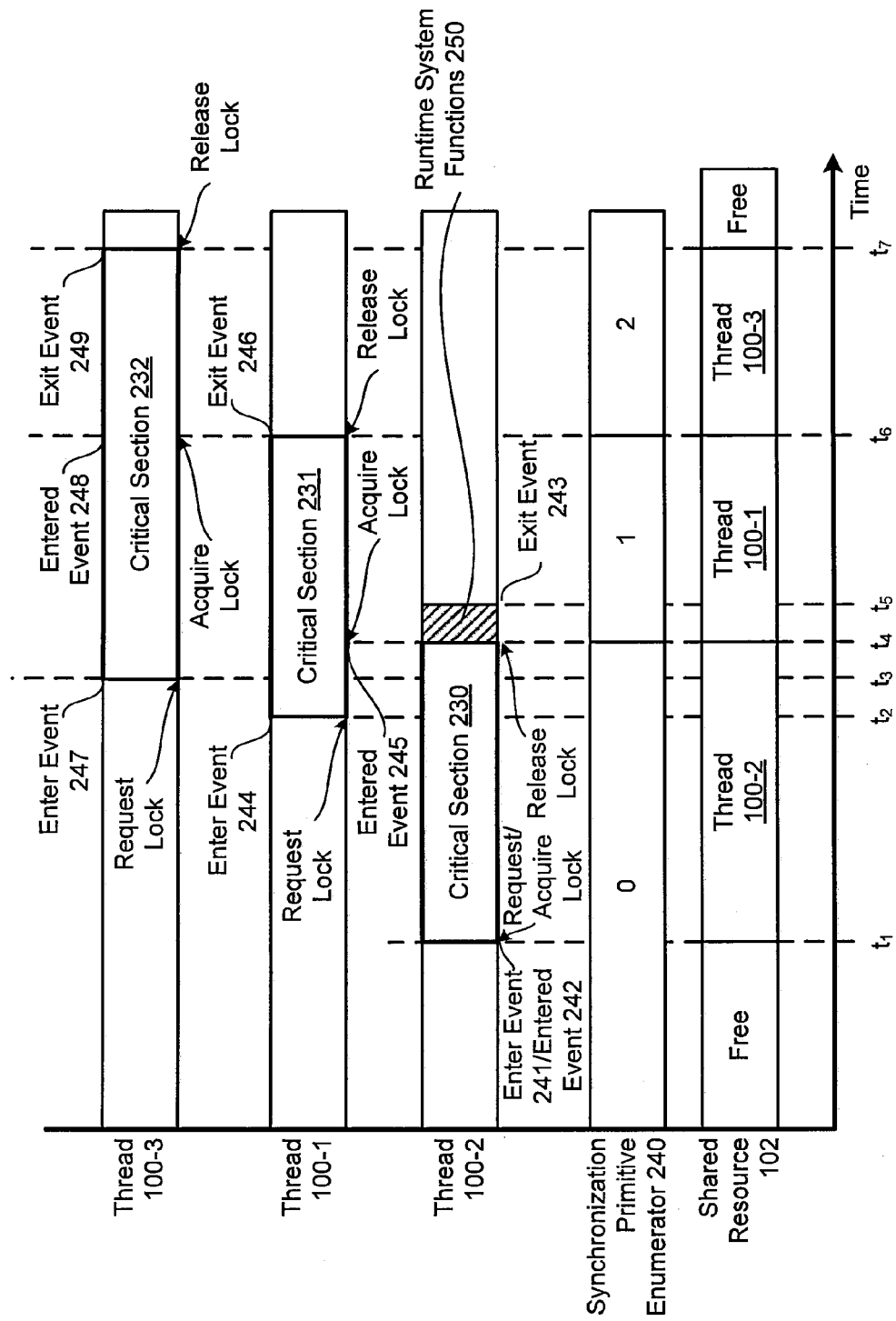
FIG. 2B is a timing diagram illustrating the identification of the order that threads of a multi-threaded application block other threads of the multi-threaded application, according to some embodiments.

At least two issues arise when attempting to display information about synchronization information relating to contention of synchronization primitives and/or shared resources. First, an amount of time that a first thread is blocked by a second thread may not correspond to a time interval between a time when the first thread requests use of a synchronization primitive guarding a shared resource and a time when the first thread acquires use of the synchronization primitive guarding the shared resource. This issue and a solution to this issue are illustrated in FIG. 2A. Second, an order in which synchronization events are emitted to a synchronization trace may not correspond to an order that the synchronization operations corresponding to the synchronization events actually occurred in the runtime system. This issue and a solution to this issue are illustrated in FIG. 2B.

FIG. 2A is a timing diagram illustrating the calculation of a time in which the thread 100-1 attempts to execute a critical section 202 that requires use of a shared resource 102, but is blocked by the thread 100-2, which is executing a critical section 201 that is using the shared resource 102, according to some embodiments. As illustrated in FIG. 2A, before time $t_1$, the shared resource 102 is free (e.g., not used by any threads). At time $t_1$, the thread 100-2 attempts to enter the critical section 201 by performing a synchronization operation that requests use of the synchronization primitive 101 that guards the shared resource 102. The monitoring functions of the runtime environment emit, to a synchronization trace, an enter event 210 corresponding to the synchronization operation that requests use of the synchronization primitive 101 that guards the shared resource 102. Since the shared resource 102 is currently free, the thread 100-2 enters the critical section 201 by performing a synchronization operation that acquires use of the synchronization primitive 101 that guards the shared resource 102. The monitoring functions of the runtime environment emit, to the synchronization trace, an entered event 211 corresponding to the synchronization operation that acquires use of the synchronization primitive 101 that guards the shared resource 102.

At time $t_2$, the thread 100-1 attempts to enter the critical section 202 by performing a synchronization operation that requests use of the synchronization primitive 101 that guards the shared resource 102. However, since the thread 100-2 is currently using the shared resource 102, the thread 100-1 waits until the synchronization primitive 101 that guards the shared resource 102 becomes free. The monitoring functions of the runtime environment emit, to the synchronization trace, an enter event 220 corresponding to the synchronization operation that requests use of the synchronization primitive 101 that guards the shared resource 102.

At time $t_3$, the thread 100-2 exits the critical section 201 by performing a synchronization operation that releases use of the synchronization primitive 101 that guards the shared resource 102. The monitoring functions of the runtime environment emit, to the synchronization trace, an exit event 212 corresponding to the synchronization operation that releases use of the synchronization primitive 101 that guards the shared resource 102. After the thread 100-2 releases use of the synchronization primitive 101 that guards the shared resource 102 (e.g., at the next clock edge of a processor, within a predetermined time period after the release of the synchronization primitive 101, etc.), the thread 100-1 enters the critical section 202 by performing a synchronization operation that acquires use of the synchronization primitive 101 that guards the shared resource 102. The monitoring functions of the runtime environment emit, to the synchronization trace, an entered event 221 corresponding to the synchronization operation that acquires use of the synchronization primitive 101 that guards the shared resource 102.

At time $t_4$, the thread 100-1 exits the critical section 202 by performing a synchronization operation that releases use of the synchronization primitive 101 that guards the shared resource 102. The monitoring functions of the runtime environment emit, to the synchronization trace, an exit event 222 corresponding to the synchronization operation that releases use of the synchronization primitive 101 that guards the shared resource 102

As illustrated in FIG. 2A, the shared resource 102 is not used before time $t_1$, is used exclusively by thread 100-2 between times $t_j$ and time $t_3$, is used exclusively by thread 100-1 between times $t_3$ and $t_4$, and is free after time $t_4$.

Also, as illustrated in FIG. 2A, the time interval wait 203 (between times $t_2$ and $t_3$) includes the time that the thread 100-1 waits 203 for the shared resource 102 due to the fact that the thread 100-2 is blocking the thread 100-1 from using the shared resource 102. However, the time interval wait 203 also includes the time the processor is performing runtime system functions 204 and/or runtime system functions 205. Runtime system functions 204 and/or the runtime system functions 205 may include functions that are not called by a user application. For example, the runtime system functions 204 and 205 may include, but are not limited to, garbage collection functions, functions that generate stack traces of threads, functions that inspect memory, functions that dump memory, etc. The runtime system functions 204 and 205 may occur periodically or randomly during execution of the multi-threaded application and affect the accuracy of the determination of the time that the thread 100-2 blocks the thread 100-1. For example, the runtime system functions 205 may not be executed during the time interval wait 203. Similarly, only a subset of the runtime system functions 205 illustrated in FIG. 2A may be executed during the time interval wait 203. Thus, when the multi-threaded application is analyzed over several successive runs of the multi-threaded application (or over several successive iterations of the execution of the critical sections 201 and 202), the amount of time that the processor spent executing runtime system functions 204 and 205 may vary from run-to-run (or iteration-to-iteration). Accordingly, in some embodiments, when determining the amount of time that the thread 100-2 blocks the thread 100-1, the amount of time that the processor executes runtime system functions 204 and 205 during the time interval wait 203 is subtracted from the time interval wait 203. These embodiments are described in more detail with respect to FIG. 7 below.

As discussed above, an order in which the synchronization events are emitted to the synchronization trace may not correspond to an order in which the synchronization operations corresponding to the synchronization events actually occurred. For example, the synchronization operations may be emitted to the synchronization trace when shared resources are highly contended. FIG. 2B is a timing diagram illustrating the identification of the order that threads of a multi-threaded application block other threads of the multi-threaded application, according to some embodiments. As illustrated in FIG. 2B, before time $t_1$, the shared resource 102 is free (e.g., not used by any threads). At time $t_1$, the thread 100-2 attempts to enter the critical section 230 by performing a synchronization operation that requests use of the synchronization primitive 101 that guards the shared resource 102. The monitoring functions of the runtime environment emit, to a synchronization trace, an enter event 241 corresponding to the synchronization operation that requests use of the synchronization primitive 101 that guards the shared resource 102. Since the shared resource 102 is currently free, the thread 100-2 enters the critical section 230 by performing a synchronization operation that acquires use of the synchronization primitive 101 that guards the shared resource 102. The monitoring functions of the runtime environment emit, to the synchronization trace, an entered event 242 corresponding to the synchronization operation that acquires use of the synchronization primitive 101 that guards the shared resource 102. Note that although FIG. 2B refers to the term "lock" (e.g., "request lock", "acquire lock", "release lock"), any type of synchronization primitive may be used.

At time $t_2$, the thread 100-1 attempts to enter the critical section 231 by performing a synchronization operation that requests use of the synchronization primitive 101 that guards the shared resource 102. However, since the thread 100-2 is currently using the shared resource 102, the thread 100-1 waits until the synchronization primitive 101 that guards the shared resource 102 becomes free. The monitoring functions of the runtime environment emit, to the synchronization trace, an enter event 244 corresponding to the synchronization operation that requests use of the synchronization primitive 101 that guards the shared resource 102.

At time $t_3$, the thread 100-3 attempts to enter the critical section 232 by performing a synchronization operation that requests use of the synchronization primitive 101 that guards the shared resource 102. However, since the thread 100-2 is currently using the shared resource 102, the thread 100-3 waits until the synchronization primitive 101 that guards the shared resource 102 becomes free. The monitoring functions of the runtime environment emit, to the synchronization trace, an enter event 247 corresponding to the synchronization operation that requests use of the synchronization primitive 101 that guards the shared resource 102.

Based on the synchronization operations (e.g., requesting a lock, acquiring a lock, releasing a lock, etc.) that have occurred by time $t_3$, the thread 100-2 blocks the thread 100-1, and the threads 100-2 and 100-1 block the thread 100-3. However, the ordering of the synchronization events is determined using the time when the synchronization event is emitted and not when the synchronization operation is performed. Times $t_4$ and $t_5$ illustrate how an incorrect ordering of the synchronization events may result in an incorrect set of blocking threads.

At time $t_4$, the thread 100-2 exits the critical section 230 by performing a synchronization operation that releases use of the synchronization primitive 101 that guards the shared resource 102. Also shortly after time $t_4$ (e.g., at the next clock edge of a processor, within a predetermined time period after the release of the synchronization primitive 101, etc.), the thread 100-1 enters the critical section 231 by performing a synchronization operation that acquires use of the synchronization primitive 101 that guards the shared resource 102. The monitoring functions of the runtime environment emit, to the synchronization trace, an entered event 245 corresponding to the synchronization operation that acquires use of the synchronization primitive 101 that guards the shared resource 102. However, instead of emitting an exit event 243 at time $t_4$, one or more runtime system functions 250 delay the monitoring functions of the runtime environment from emitting the exit event 243 until time $t_5$. This behavior occurs because it is desirable to reduce the amount of code (and the corresponding execution time of the code) between acquiring a synchronization primitive and releasing the synchronization primitive to reduce the amount of time that a synchronization primitive (and/or shared resource) is blocked. Accordingly, code that reports an exit event is typically executed after the release of the synchronization primitive. As illustrated in FIG. 2B, at time $t_5$, the monitoring functions of the runtime environment emit, to the synchronization trace, the exit event 243 corresponding to the synchronization operation that releases use of the synchronization primitive 101 that guards the shared resource 102. Thus, the exit event 243 occurs after the entered event 245. This ordering of synchronization events produces results that are not consistent with the order in which the corresponding synchronization operations actually occurred in the runtime system.

At time $t_6$, the thread 100-1 exits the critical section 231 by performing a synchronization operation that releases use of the synchronization primitive 101 that guards the shared resource 102. The monitoring functions of the runtime environment emit, to the synchronization trace, an exit event 246 corresponding to the synchronization operation that releases use of the synchronization primitive 101 that guards the shared resource 102. Shortly after time $t_6$ (e.g., at the next clock edge of a processor, within a predetermined time period after the release of the synchronization primitive 101, etc.), the thread 100-3 enters the critical section 232 by performing a synchronization operation that acquires use of the synchronization primitive 101 that guards the shared resource 102. The monitoring functions of the runtime environment emit, to the synchronization trace, an entered event 248 corresponding to the synchronization operation that acquires use of the synchronization primitive 101 that guards the shared resource 102.

At time $t_7$, the thread 100-3 exits the critical section 232 by performing a synchronization operation that releases use of the synchronization primitive 101 that guards the shared resource 102. The monitoring functions of the runtime environment emit, to the synchronization trace, an exit event 249 corresponding to the synchronization operation that releases use of the synchronization primitive 101 that guards the shared resource 102.

As illustrated in FIG. 2B, the shared resource 102 is not used before time $t_1$, is used exclusively by thread 100-2 between times $t_1$ and time $t_4$, is used exclusively by thread 100-1 between times $t_4$ and $t_6$, is used exclusively by the thread 100-3 between times $t_6$ and $t_7$, and is free after time $t_7$.

To correctly report the sequence of synchronization operations performed in the runtime system, some embodiments provide a synchronization primitive enumerator for a synchronization primitive that is incremented when the synchronization operation satisfies predetermined criteria. In some embodiments, the synchronization operation satisfies predetermined criteria when the synchronization operation is an operation that releases the synchronization primitive. In some embodiments, the synchronization primitive enumerator is only incremented when at least one other thread is awaiting use of the synchronization primitive. In other words, the synchronization primitive enumerator is only incremented when at least two threads are contending for use of the synchronization primitive. In some embodiments, the synchronization primitive enumerator is incremented when a number of threads awaiting use of the synchronization primitive becomes less than or equal to one. These embodiments account for the situation in which a synchronization primitive is in an inflated state when two or more threads are contending for the synchronization primitive and reverts to a deflated state when zero or one thread is using the synchronization primitive.

Exemplary values of the synchronization primitive enumerator 240 are illustrated in FIG. 2B. For example, assuming that a value of a synchronization primitive enumerator 240 is zero before time $t_1$, the synchronization primitive enumerator 240 is incremented by one when the thread 100-2 releases the synchronization primitive 101 because the synchronization primitive 101 is in an inflated state starting at time $t_2$ (e.g., both the threads 100-1 and 100-2 are contending for use of the synchronization primitive 101). The synchronization primitive enumerator 240 is incremented by one again when the thread 100-1 releases the synchronization primitive 101. However, unlike the previous incrementing of the synchronization primitive enumerator 240, this incrementing of the synchronization primitive enumerator 240 is due to the synchronization primitive 101 transitioning from an inflated state to a deflated state. After the synchronization primitive 101 is in the deflated state, the synchronization primitive enumerator 240 is no longer incremented when threads release the synchronization primitive 101. For example, a value of the synchronization primitive enumerator 240 remains the same when the thread 100-3 releases the synchronization primitive 101. The synchronization primitive enumerator 240 may be incremented again when the synchronization primitive 101 is in the inflated state and a thread releases use of the synchronization primitive 101. Note that although the discussion above refers to incrementing the synchronization primitive enumerator 240 when threads release the synchronization primitive 101, the synchronization primitive enumerator 240 may be incremented in response to other synchronization operations.

Using the synchronization primitive enumerator 240, the correct ordering of the synchronization events is now achieved. Specifically, the value of the synchronization primitive enumerator 240 for the exit event 243 is 0 and the value of the entered event 245 is 1. Thus, the exit event 243 is determined to occur before the entered event 245.

In some embodiments, the synchronization event includes a value of a synchronization primitive enumerator at the time that the synchronization operation occurred. In other words, the value of the synchronization primitive enumerator is not the value at the time the synchronization event is emitted, but is instead the value of the synchronization primitive enumerator at the time the synchronization event (e.g., when requesting use of the synchronization primitive, when acquiring use of the synchronization primitive, when releasing use of the synchronization primitive, etc.) occurred.

Figure 3:
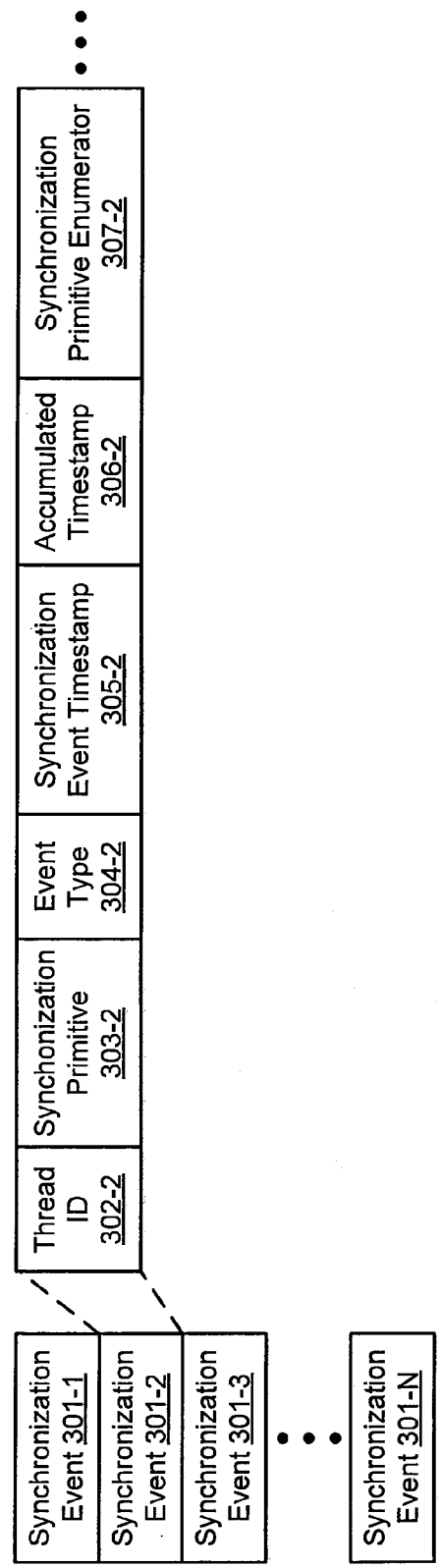
FIG. 3 is a block diagram illustrating a synchronization event data structure, according to some embodiments.

Attention is now directed to FIG. 3, which is a block diagram illustrating a synchronization event data structure, according to some embodiments. The synchronization event data structure includes synchronization events 301. A respective synchronization event 301 includes a thread identifier 302 identifying a thread corresponding to a synchronization operation, a synchronization primitive 303 identifying a synchronization primitive on which the synchronization operation is performed, an event type 304 identifying the type of synchronization operation being performed, a synchronization event timestamp 305 identifying a time that the synchronization operation is reported to the runtime system (e.g., a time when the synchronization event is emitted to the synchronization trace), an accumulated timestamp 306 indicating an accumulated amount of time that the processor has performed runtime system functions at the time the synchronization operating is reported to the runtime system, and a synchronization primitive enumerator 307 identifying an ordering of a sequence of synchronization operations performed on the synchronization primitive. In some embodiments, the synchronization events 301 include stack traces for respective threads associated with the respective synchronization event.

Figure 4:
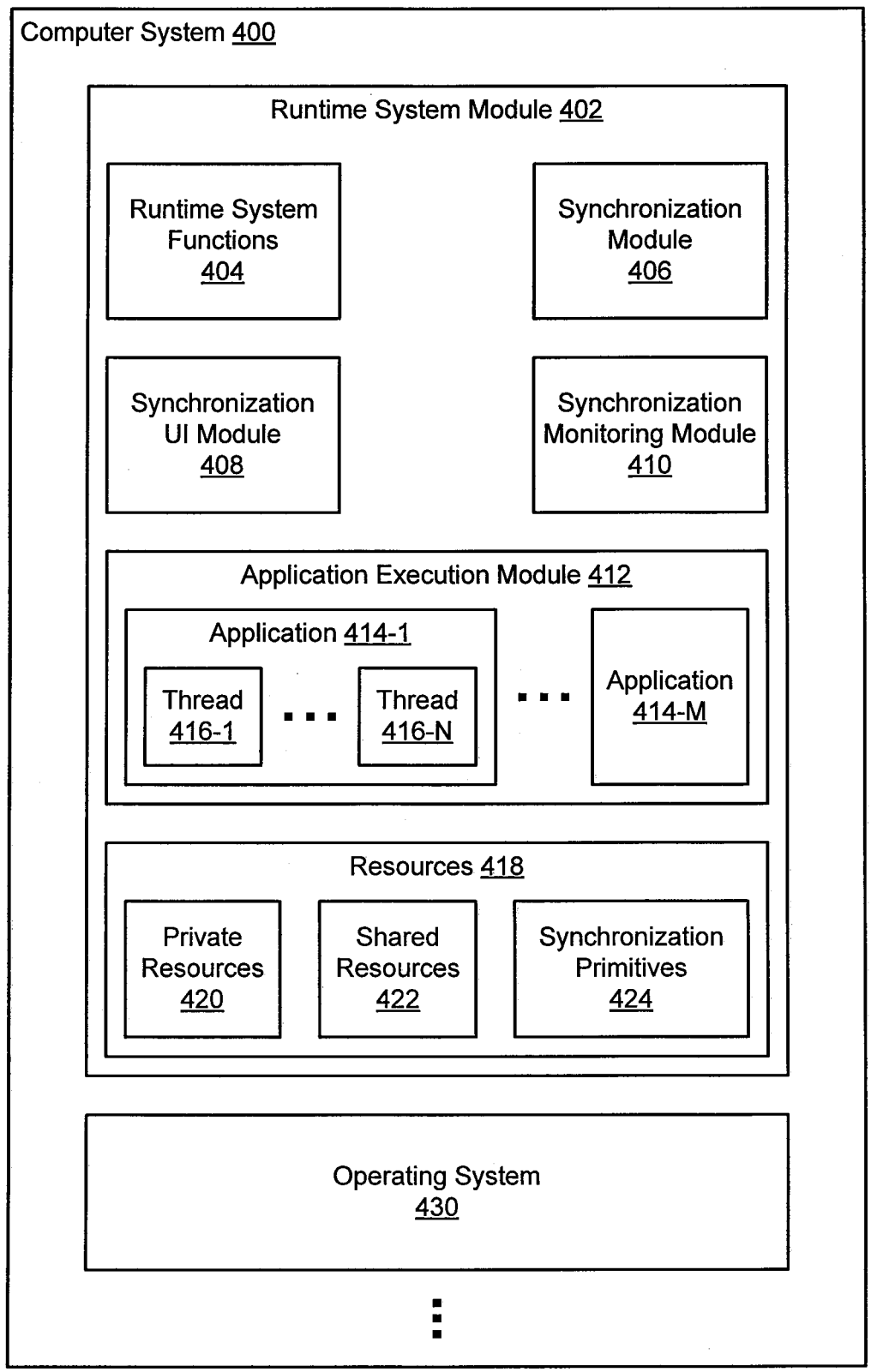
FIG. 4 is a block diagram illustrating modules of a computer system, according to some embodiments.
Figure 5:
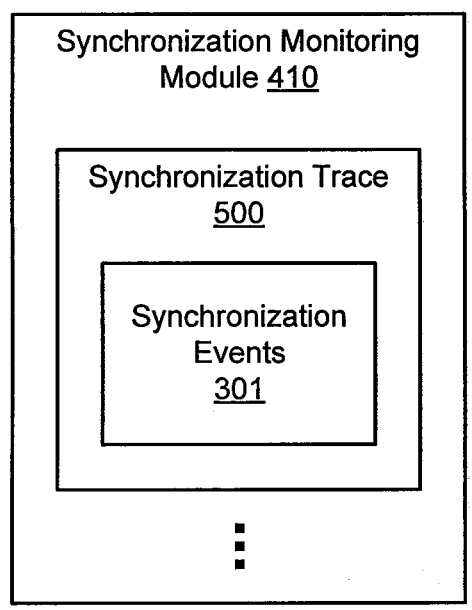
FIG. 5 is a block diagram illustrating a synchronization module, according to some embodiments.

FIG. 4 is a block diagram illustrating modules of a computer system 400, according to some embodiments. The computer system 400 includes a runtime system module 402 including runtime system functions 404, a synchronization module 406 configured to perform synchronization operations on synchronization primitives 424, a synchronization user interface (UI) module 408 configured to display information relating to synchronization events in the runtime system module 402, a synchronization monitoring module 410 configured to monitor synchronization primitives in the runtime system module 402, an application execution module 412 to execute at least one multi-threaded application 414 in which multiple threads 416 are executed substantially concurrently within the runtime system module 402, and resources 418 including private resources 420, shared resources 422, and synchronization primitives 424 corresponding to the shared resources 422. Referring to FIG. 5, in some embodiments, the synchronization monitoring module 410 is configured to emit synchronization events 301 to a synchronization trace 500.

The computer system 400 also includes an operating system 430 that includes procedures for handling various basic system services and for performing hardware dependent tasks.

Figure 6:
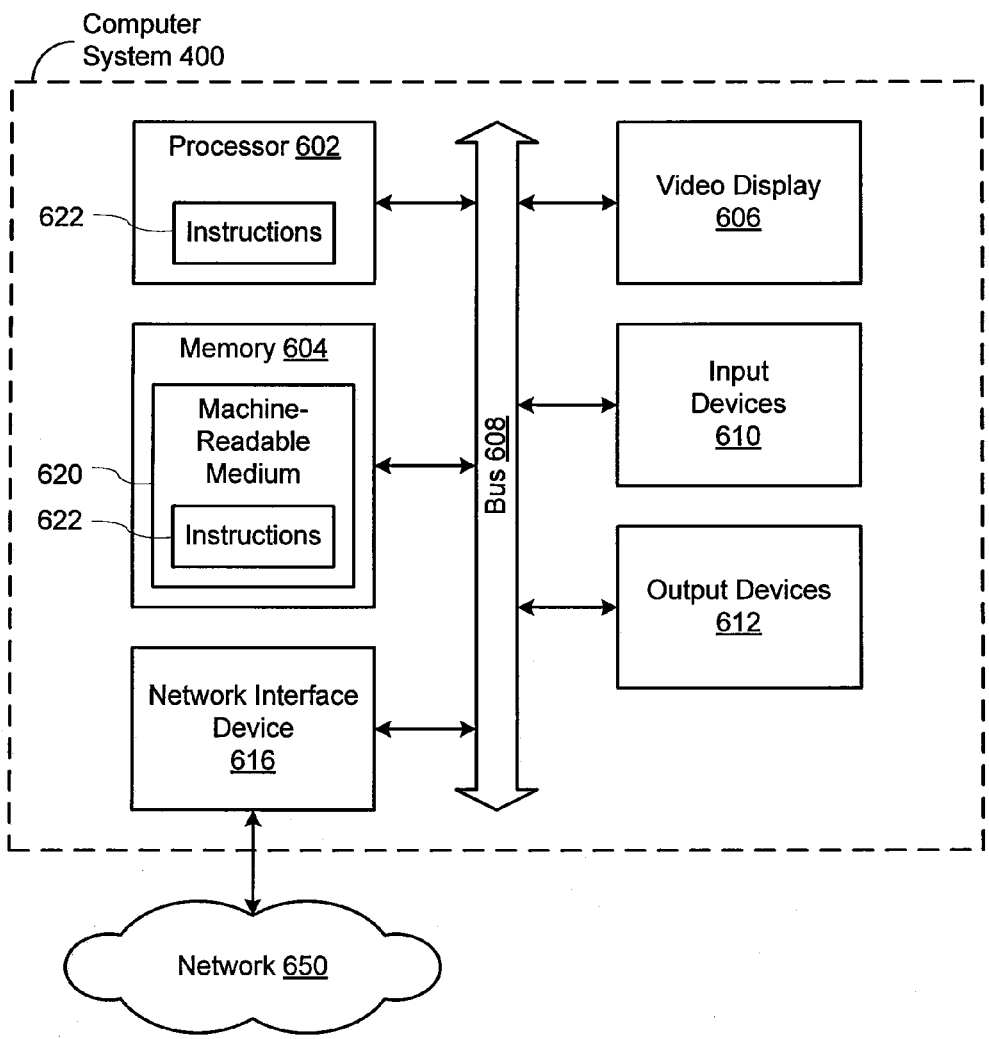
FIG. 6 is a block diagram illustrating an exemplary computer system, according to some embodiments.

FIG. 6 depicts a block diagram of a machine in the example form of a computer system 400 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 400 includes a processor 602 (e.g., a central processing unit (CPU), a graphics processing unit (GPU) or both), and memory 604, which communicate with each other via bus 608. Memory 604 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 604 may optionally include one or more storage devices remotely located from the computer system 400. The computer system 400 may further include video display unit 606 (e.g., a plasma display, a liquid crystal display (LCD) or a cathode ray tube (CRT)). The computer system 400 also includes input devices 610 (e.g., keyboard, mouse, trackball, touchscreen display, etc.), output devices 612 (e.g., speakers), and a network interface device 616. The aforementioned components of the computer system 400 may be located within a single housing or case (e.g., as depicted by the dashed lines in FIG. 6). Alternatively, a subset of the components may be located outside of the housing. For example, the video display unit 606, the input devices 610, and the output device 612 may exist outside of the housing, but be coupled to the bus 608 via external ports or connectors accessible on the outside of the housing.

Memory 604 includes a machine-readable medium 620 on which is stored one or more sets of data structures and instructions 622 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 622 may also reside, completely or at least partially, within memory 604 and/or within the processor 602 during execution thereof by computer system 400, with memory 604 and processor 602 also constituting machine-readable, tangible media.

The data structures and instructions 622 may further be transmitted or received over a network 650 via network interface device 616 utilizing any one of a number of well-known transfer protocols (e.g., HyperText Transfer Protocol (HTTP)). Network 650 can generally include any type of wired or wireless communication channel capable of coupling together computing nodes (e.g., the computer system 400). This includes, but is not limited to, a local area network, a wide area network, or a combination of networks. In some embodiments, network 650 includes the Internet.

Determining a Runtime of a Thread

As discussed above, the actual runtime of an application (or thread) is typically different than a simple difference between two events of the application (e.g., a start and an end of the application). This discrepancy in the actual runtime of the application (or thread) is due to the fact that the runtime system itself has to do some work (e.g., updating its own data structures or doing general clean-up such as garbage collection). During this time, the application (or thread) typically stops execution of its own code while the runtime system performs its functions. Hence, some embodiments determine the time during which the application (or thread) was temporarily stopped so that the actual runtime of the application (or thread) can be calculated. Thus, the runtime of the application (or thread) includes only the time that the runtime system (or the processor) spent executing application code, and does not include the time that the runtime system (or the processor) spent executing runtime system functions or other functions not called by the application (or thread).

Figure 7:
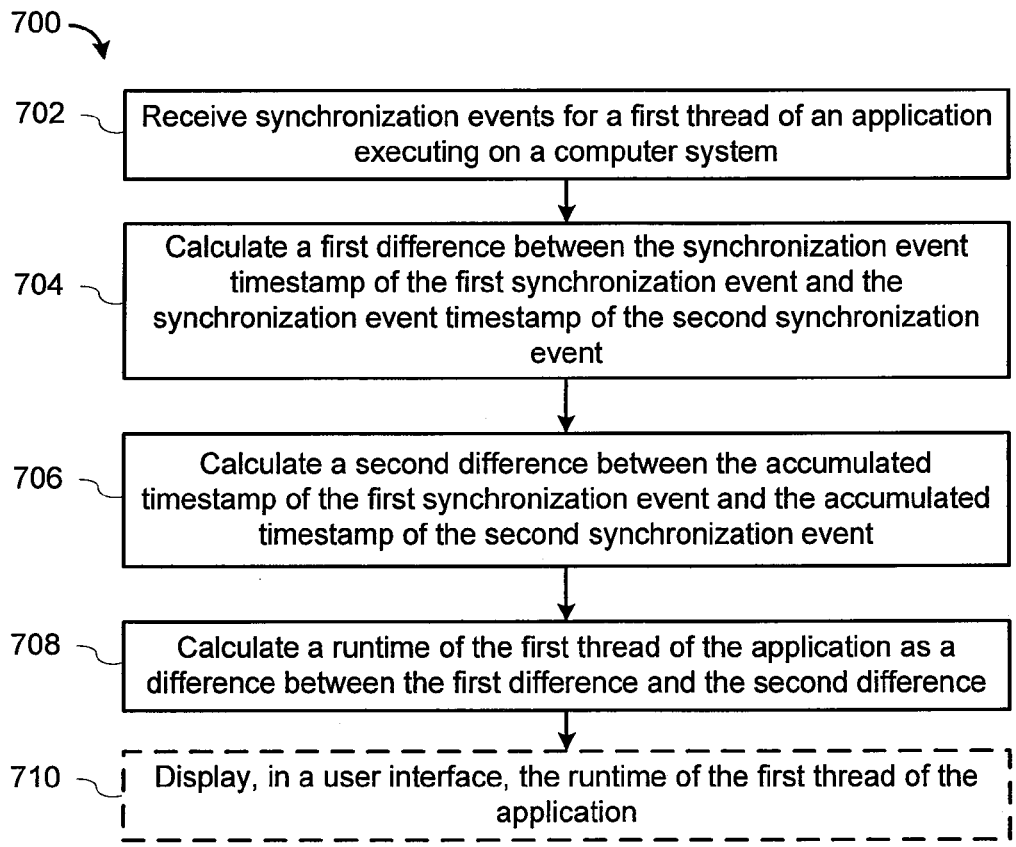
FIG. 7 is a flowchart of a method for determining a runtime of a thread of an application, according to some embodiments.

FIG. 7 is a flowchart of a method 700 for determining a runtime of a thread of an application, according to some embodiments. In some embodiments, the method 700 is performed by the synchronization user interface module 408 of the runtime system module 402 in the computer system 400. The synchronization user interface module 408 receives (702) synchronization events for a first thread of an application executing on the computer system, the synchronization events including at least a first synchronization event and a second synchronization event for the first thread, wherein each synchronization event includes a synchronization event timestamp corresponding to a time at which the synchronization event occurred and an accumulated timestamp corresponding to an accumulated time during which a runtime system of the computer system has been executing runtime system operations. For example, the first synchronization event for the first thread may include a synchronization event timestamp having a value 9:30 PM on Jan. 1, 2010, and the second synchronization event for the first thread may include a synchronization event timestamp having a value 9:45 PM on Jan. 1, 2010. Furthermore, the first synchronization event for the first thread may include an accumulated timestamp having a value 1:00, and the second synchronization event for the first thread may include an accumulated timestamp having a value 1:05. Note that the accumulated timestamp represents a running clock that indicates the total time a runtime system has executed runtime system functions. When the runtime system module 402 executes a runtime system function 404, the accumulated timestamp begins to count time. When the runtime system module 402 finishes execution of the runtime system function 404, the accumulated timestamp stops counting time. For example, if the value of the accumulated timestamp is 1:00 when the runtime system module 402 starts executing the runtime system function 404 and the runtime system module 402 executes the runtime system function 404 for 15 seconds, the accumulated timestamp when the runtime system module 402 finishes executing the runtime system function 404 is 1:00:15.

The synchronization user interface module 408 calculates (704) a first difference between the synchronization event timestamp of the first synchronization event and the synchronization event timestamp of the second synchronization event. Continuing the example from above, the difference between the values of the first and second timestamps is 15 minutes.

The synchronization user interface module 408 calculates (706) a second difference between the accumulated timestamp of the first synchronization event and the accumulated timestamp of the second synchronization event. Continuing the example from above, the difference between the values of the first and second timestamps is 5 minutes. As discussed above, this difference indicates the total amount of time that the runtime system functions were executing in the runtime system module 402 during the execution of the first thread.

The synchronization user interface module 408 calculates (708) a runtime of the first thread of the application as a difference between the first difference and the second difference. Continuing the example from above, the actual runtime of the first thread is 15−5=10 minutes.

In some embodiments, the synchronization user interface module 408 displays (710), the runtime of the first thread of the application in a user interface of the computer system 400.

Determining and Displaying Contention Information

FIGS. 8-12 illustrate several types of contention information that may be determined from synchronization events 301 in the synchronization trace 500 and displayed in the user interface of the computer system 400. Note that other types of contention information may be derived from the synchronization events 301 in the synchronization trace 500.

Figure 8:
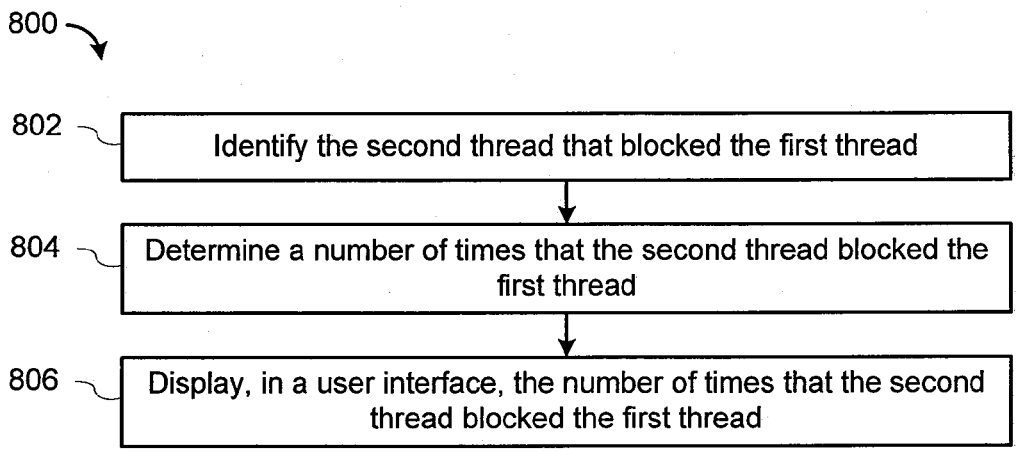
FIG. 8 is a flowchart of a method for determining and displaying a number of times a first thread was blocked by a second thread, according to some embodiments.
Figure 9:
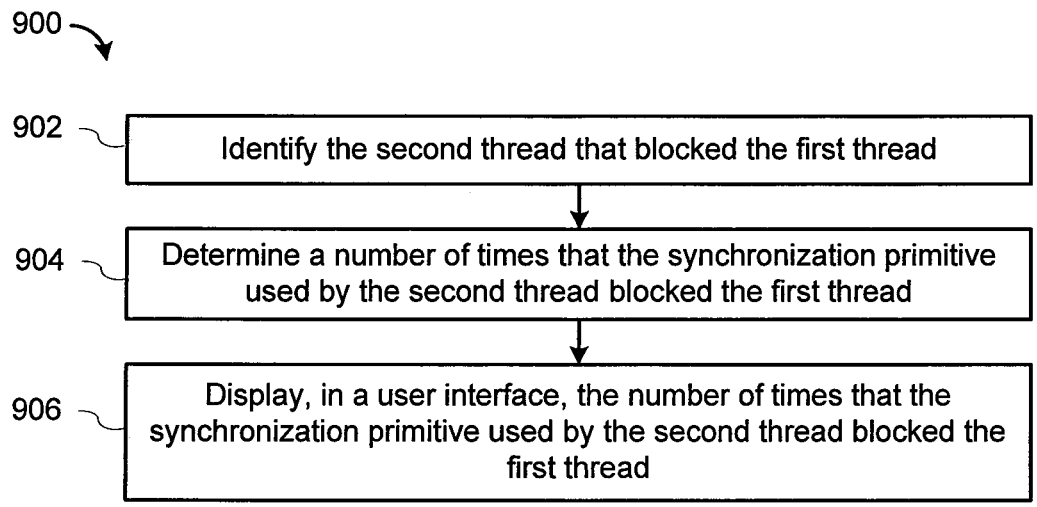
FIG. 9 is a flowchart of a method for determining and displaying a number of times a synchronization primitive used by a second thread blocked a first thread, according to some embodiments.

FIGS. 8 and 9 refer to the first thread discussed above with respect to FIG. 7 and a second thread that blocked the first thread from using a synchronization primitive.

FIG. 8 is a flowchart of a method 800 for determining and displaying a number of times the first thread was blocked by the second thread, according to some embodiments. In these embodiments, the first synchronization event for the first thread is an enter event (e.g., the first thread requests use of the synchronization primitive) and the second synchronization event for the first thread is an entered event (e.g., the first thread acquires use of the synchronization primitive).

The synchronization user interface module 408 identifies (802) the second thread that blocked the first thread. For example, the synchronization user interface module 408 may analyze synchronization events 301 in the synchronization trace 500 to identify the second thread that blocked the first thread.

The synchronization user interface module 408 determines (804) a number of times that the second thread blocked the first thread. For example, the synchronization user interface module 408 may analyze synchronization events 301 in the synchronization trace 500 to identify a number of times that the second thread blocked the first thread.

The synchronization user interface module 408 displays (806), in a user interface of the computer system 400, the number of times that the second thread blocked the first thread.

FIG. 9 is a flowchart of a method 900 for determining and displaying a number of times a synchronization primitive used by a second thread blocked a first thread, according to some embodiments. In these embodiments, the first synchronization event for the first thread is an enter event (e.g., the first thread requests use of the synchronization primitive) and the second synchronization event for the first thread is an entered event (e.g., the first thread acquires use of the synchronization primitive).

The synchronization user interface module 408 identifies (902) the second thread that blocked the first thread. For example, the synchronization user interface module 408 may analyze synchronization events 301 in the synchronization trace 500 to identify the second thread that blocked the first thread.

The synchronization user interface module 408 determines (904) a number of times that the synchronization primitive used by the second thread blocked the first thread. For example, the synchronization user interface module 408 may analyze synchronization events 301 in the synchronization trace 500 to identify a number of times that the synchronization primitive used by the second thread blocked the first thread.

The synchronization user interface module 408 displays (906) the number of times that the synchronization primitive used by the second thread blocked the first thread in a user interface of the computer system 400.

Figure 10:
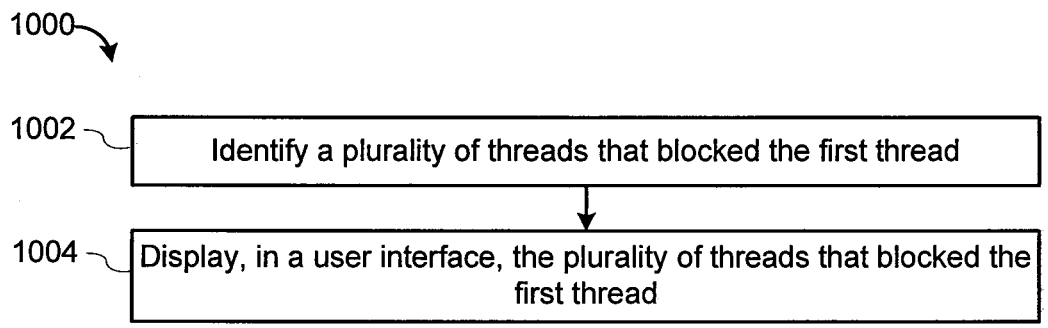
FIG. 10 is a flowchart of a method for identifying and displaying threads that blocked a first thread, according to some embodiments.
Figure 11:
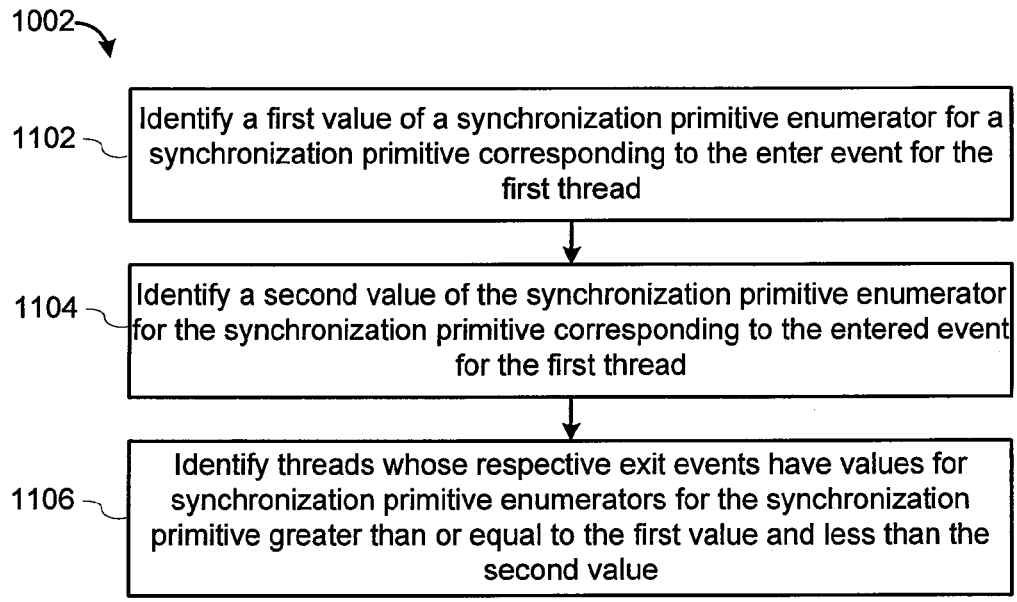
FIG. 11 is a flowchart of a method for identifying threads that blocked a first thread, according to some embodiments.
Figure 12:
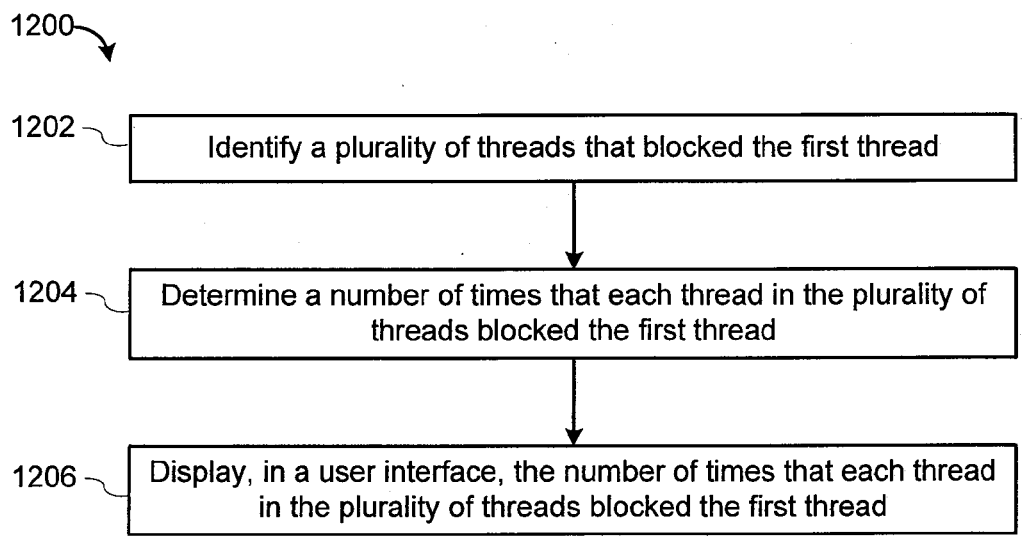
FIG. 12 is a flowchart of a method for determining and displaying a number of times that threads have blocked a first thread, according to some embodiments.

FIGS. 10-12 refer to the first thread discussed above with respect to FIG. 7 and a plurality of threads that blocked the first thread from using a synchronization primitive.

FIG. 10 is a flowchart of a method 1000 for identifying and displaying threads that blocked a first thread, according to some embodiments. In these embodiments, the first synchronization event for the first thread is an enter event (e.g., the first thread requests use of the synchronization primitive) and the second synchronization event for the first thread is an entered event (e.g., the first thread acquires use of the synchronization primitive).

The synchronization user interface module 408 identifies (1002) a plurality of threads that blocked the first thread. For example, the synchronization user interface module 408 may analyze synchronization events 301 in the synchronization trace 500 to identify the plurality of thread that blocked the first thread.

The synchronization user interface module 408 displays (1004), in a user interface of the computer system 400, the plurality of threads that blocked the first thread.

FIG. 11 is a flowchart of a method for identifying (1002) threads that blocked a first thread, according to some embodiments. The synchronization user interface module 408 identifies (1102) a first value of a synchronization primitive enumerator for a synchronization primitive corresponding to the enter event for the first thread. Next, the synchronization user interface module 408 identifies (1104) a second value of the synchronization primitive enumerator for the synchronization primitive corresponding to the entered event for the first thread. The synchronization user interface module 408 then identifies (1106) threads whose respective exit events have values for synchronization primitive enumerators for the synchronization primitive greater than or equal to the first value and less than or equal to the second value. For example, assume that the first thread is the thread 100-3 in FIG. 2B. The value of the synchronization primitive enumerator 240 for the enter event 247 is 0 and the value of the synchronization primitive enumerator 240 for the entered event 248 is 2. Thus, the value of the synchronization primitive enumerator 240 for the exit event 243 is 0 and the value of the synchronization primitive enumerator 240 for the exit event 246 is 1, both of which are between 0 and 2. Thus, the synchronization user interface module 408 identifies that the thread 100-2 and 100-1 are blocking the thread 100-3.

FIG. 12 is a flowchart of a method 1200 for determining and displaying a number of times that threads have blocked a first thread, according to some embodiments. In these embodiments, the first synchronization event for the first thread is an enter event (e.g., the first thread requests use of the synchronization primitive) and the second synchronization event for the first thread is an entered event (e.g., the first thread acquires use of the synchronization primitive).

The synchronization user interface module 408 identifies (1202) a plurality of threads that blocked the first thread. For example, the synchronization user interface module 408 may analyze synchronization events 301 in the synchronization trace 500 to identify the plurality of thread that blocked the first thread.

The synchronization user interface module 408 determines (1204) a number of times that each thread in the plurality of threads blocked the first thread. For example, the synchronization user interface module 408 may analyze synchronization events 301 in the synchronization trace 500 to identify a number of times that each thread in the plurality of threads blocked the first thread.

The synchronization user interface module 408 displays (1206), in a user interface of the computer system 400, the number of times that each thread in the plurality of threads blocked the first thread.

Determining which thread blocks another thread from acquiring a contended synchronization primitive is crucial for calculating the dependencies between the involved threads. It is rather useless to know that a thread of execution was blocked without knowing the actual reason (e.g., the thread of execution blocking it).

Additionally, synchronization primitives may become contended at any time, and contention may disappear any time. In some embodiments, the synchronization monitoring functions only emit synchronization events for contended synchronization primitives. In these embodiments, the synchronization events in the synchronization trace may not be complete. For example, it is possible that the synchronization trace includes enter and entered events for a synchronization primitive but not the corresponding exit event because the contention was resolved meanwhile. The synchronization user interface module 408 has to handle missing events without displaying incorrect or confusing results. Thus, in some embodiments, the synchronization user interface module 408 considers synchronization events if the complete set of synchronization events is available (e.g., an enter event is ignored if no corresponding entered and exit events are received).

Note that it is typically not sufficient to only determine the thread that was blocking another thread. For proper analysis and resolution of the problem, the user also needs to know what the thread was executing when it blocked another thread. Thus, in some embodiments, the synchronization events include information about what the thread was executing at the time the synchronization events were emitted to the synchronization trace. In systems capable of running more than one thread of execution in parallel, this is a severe problem because, in general, there is no easy way of determining the state of a running thread without stopping it. Pausing threads is not desirable for a profiler because it seriously impacts performance and changes the runtime behavior. Thus, in some embodiments, instead of pausing threads, the monitoring functions emit stack traces to the synchronization trace. The synchronization user interface may use the stack traces from the exit events as the stack trace of threads blocking other threads. Although the stack trace from exit events may not be the exact stack trace of the blocking thread when the other thread become blocked, using the stack trace of the exit event allows the user to identify the critical section that caused the other thread to be blocked. Knowing the exact position inside the critical section does not add much value since it does not differ from a synchronization point of view (e.g., if a critical section includes statements one to three, the other thread becomes blocked independent from the current execution position of the thread in the critical section).

Exemplary User Interface

In some embodiments, the synchronization user interface module 408 takes the events emitted from the synchronization trace 500, evaluates them, and visualizes the results. This way the user can start with a comprehensible set of information and drill down into the details of the synchronization problems at hand without being overwhelmed by the amount of information that the synchronization trace 500 includes.

In some embodiments, there are two main entry points for the user provided by the synchronization user interface module 408. First, it is possible to begin by focusing on the threads of execution and the contention between them. Second, the user can start by directly taking the synchronization primitives into account and look for extensive contention of synchronization primitives. While the first approach is especially useful in environments where each task/application runs in its own thread of execution, the second one may be better suited for application servers or environments where tasks run on a shared thread pool in a time sharing fashion (e.g., i.e. some parts of a task/application may be executed on several different threads).

Using the first entry point, the blocked thread statistics may show for each thread of execution how often it was blocked by any synchronization primitive and how long it was blocked overall. The times are reported in actual application runtime (as discussed above). By selecting a number of threads from the blocked thread statistic, the user may drill down into the blocking thread statistic that displays the threads that have been blocking the selected threads. In the blocking thread statistic, every thread is annotated with the number of times it has blocked one of the formerly selected threads and with the application runtime the selected thread was blocked.

Both thread statistics allow the user to drill down into a calling method statistic that shows the stack traces of the threads (e.g., the stack trace when the thread was blocked or the stack of the thread blocking another thread). For every distinct stack trace of a thread of execution, the calling method statistic of the synchronization user interface module 408 shows how long each stack trace was blocked overall and how often it happened. From this point, the synchronization user interface module 408 enables the user to deep dive into any suitable single blocking occurrence and to analyze which occurrence took how long.

Using the second major entry point, users can start from the contended synchronization primitives. In this statistic, each contended synchronization primitive is displayed with a number of times any thread of execution was blocked waiting for exclusive access of this synchronization primitive and the accumulated application runtime that was wasted by the blocked threads (e.g., the cumulative time any thread was blocked due to contention of this synchronization primitive). By selecting any number of synchronization primitives, the synchronization user interface module 408 enables the user to get blocked thread statistics for the selected synchronization primitives. Furthermore, it is possible to deep dive into the single blocking occurrences. Doing so may provide, for example, insights into whether only a few blocking occurrences took a long time or if the blocking time is uniformly distributed.

FIGS. 13-20 illustrate screenshots of exemplary user interfaces that may be produced by the synchronization user interface module 408 using data from the synchronization events 301 in the synchronization trace 500.

Figure 13:
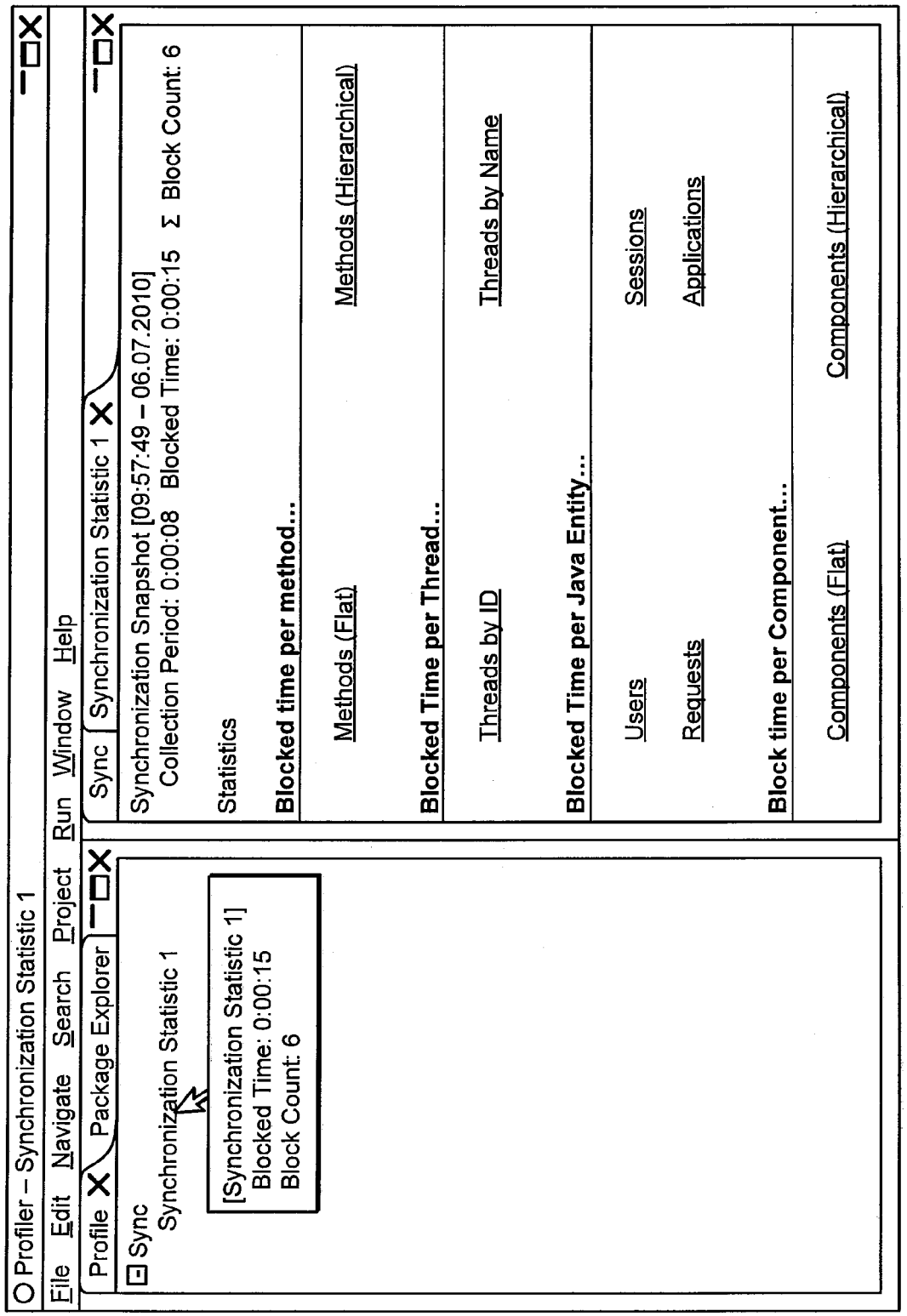
FIG. 13 is a screenshot of a user interface illustrating various synchronization statistics that may be displayed, according to some embodiments.

FIG. 13 is a screenshot of a user interface illustrating various synchronization statistics that may be displayed, according to some embodiments. For example, the synchronization statistics may include an amount of time that methods are blocked, an amount of time that threads are blocked, an amount of time that entities (e.g., JAVA entities) are blocked, and an amount of time that components are blocked.

Figure 14:
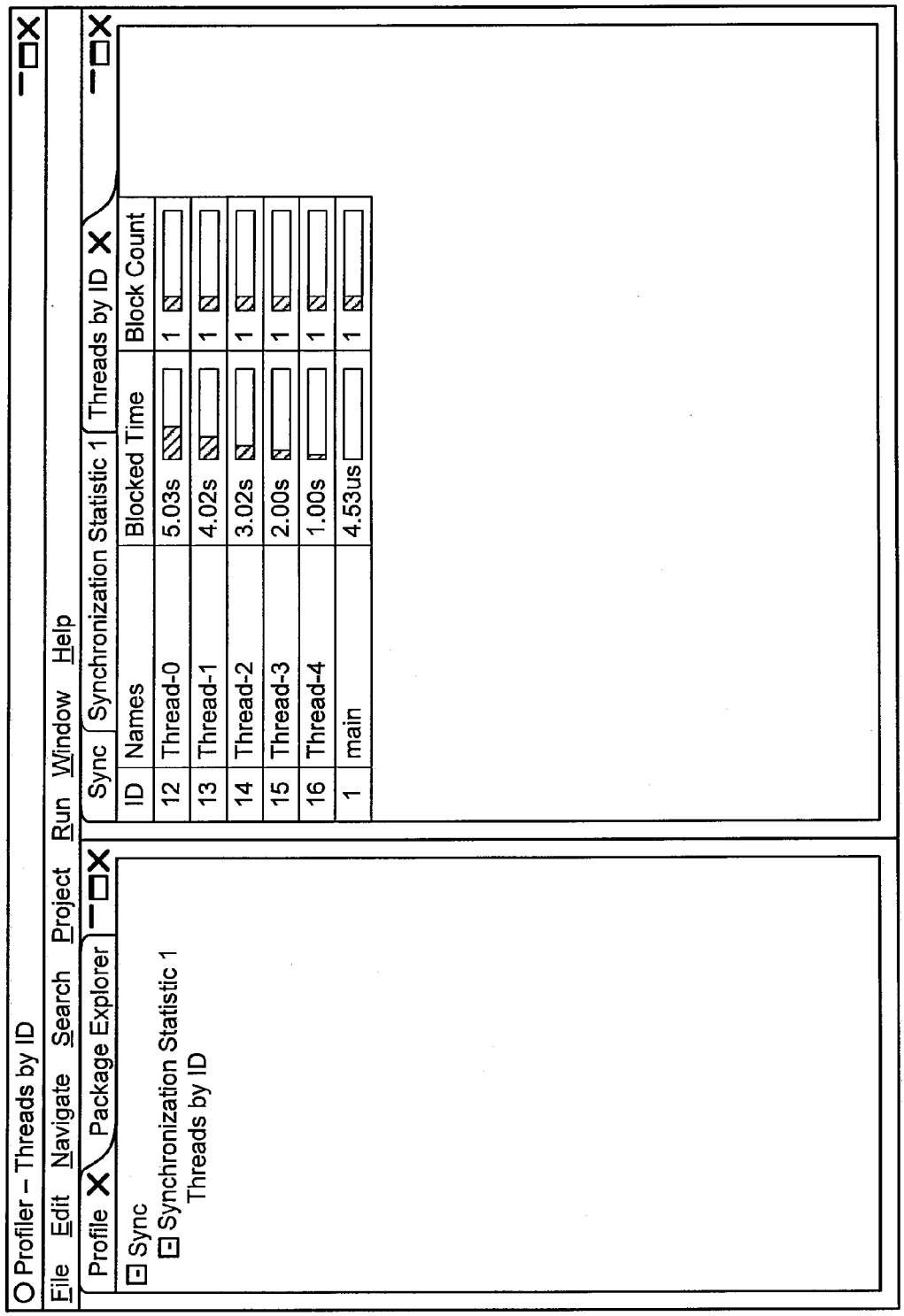
FIG. 14 is a screenshot of a user interface illustrating an amount of time and a number of times that threads are blocked, according to some embodiments.

FIG. 14 is a screenshot of a user interface illustrating an amount of time and a number of times that threads are blocked, according to some embodiments.

Figure 15:
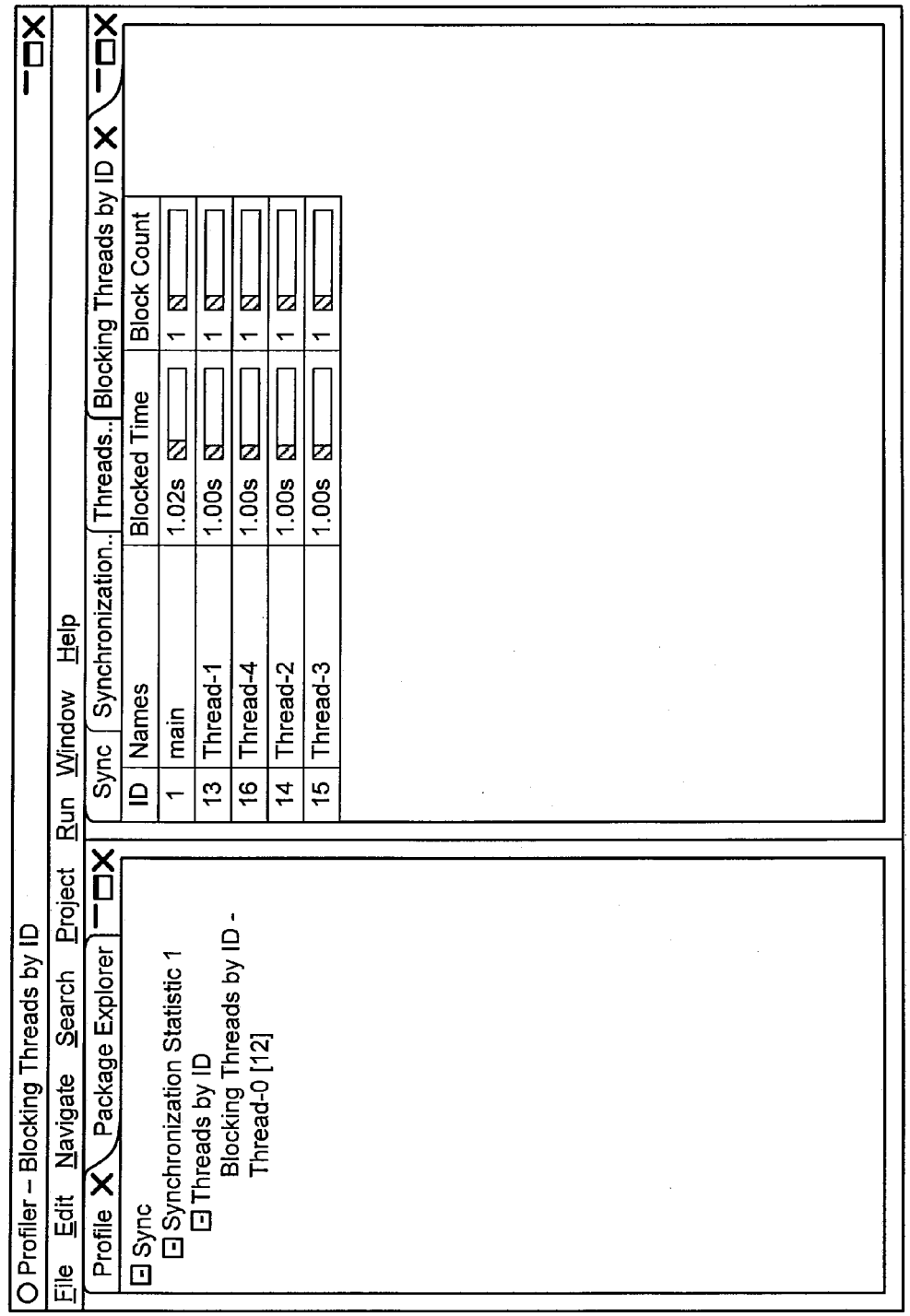
FIG. 15 is a screenshot of a user interface illustrating an amount of time and a number of times that a thread has been blocked by other threads, according to some embodiments.

FIG. 15 is a screenshot of a user interface illustrating an amount of time and a number of times that a thread (e.g., thread-0) has been blocked by other threads, according to some embodiments.

Figure 16:
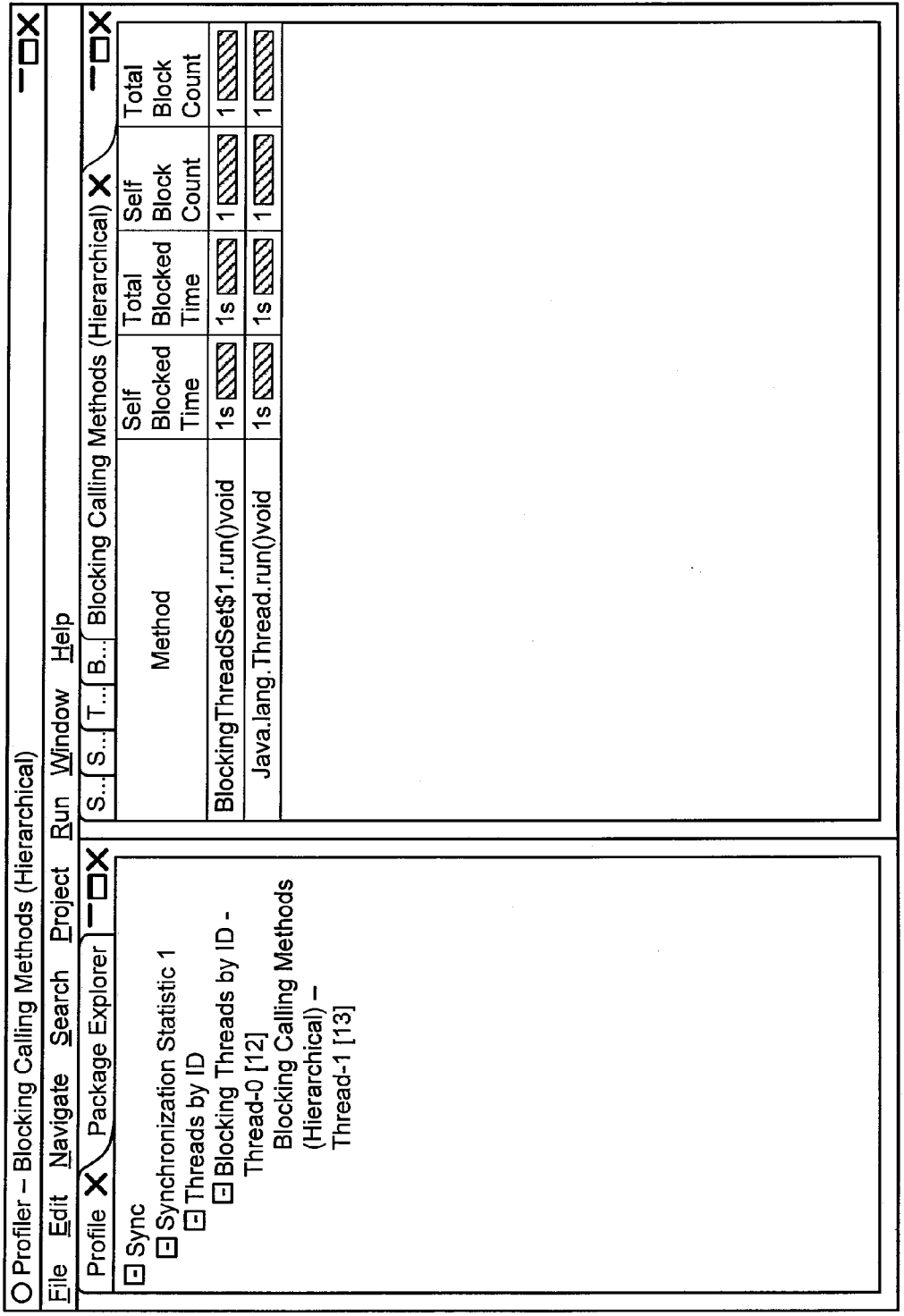
FIG. 16 is a screenshot of a user interface illustrating an amount of time and a number of times that a thread has been blocked by methods, according to some embodiments.

FIG. 16 is a screenshot of a user interface illustrating an amount of time and a number of times that a thread (e.g., thread-0) has been blocked by methods, according to some embodiments. Note that "self blocked time" and 'self-blocked count" refer to an amount of time and a number of times, respectively, that a first method blocked a second method while the first method was the top of the execution stack (e.g., the first method blocked the second method directly). "Total blocked time" and "total blocked count", analogously, refer to situations where a first method blocked a second method while the first method was somewhere in the execution stack (e.g., the first method blocked the second method directly or indirectly through another called method).

Figure 17:
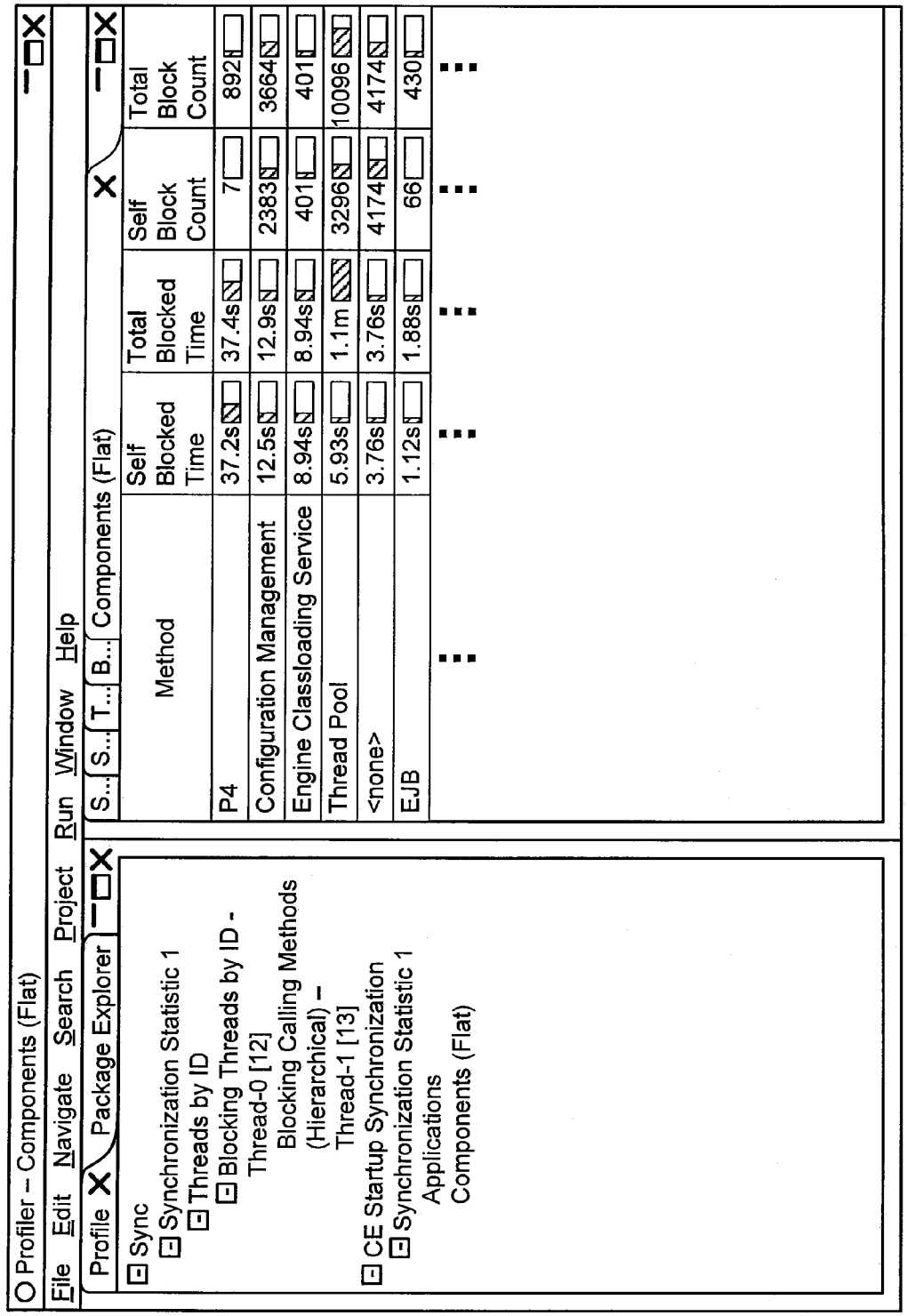
FIG. 17 is a screenshot of a user interface illustrating an amount of time and a number of times that components are blocked, according to some embodiments.

FIG. 17 is a screenshot of a user interface illustrating an amount of time and a number of times that components are blocked, according to some embodiments. FIG. 17 displays the components in a "flat" (e.g., non-hierarchical) view.

Figure 18:
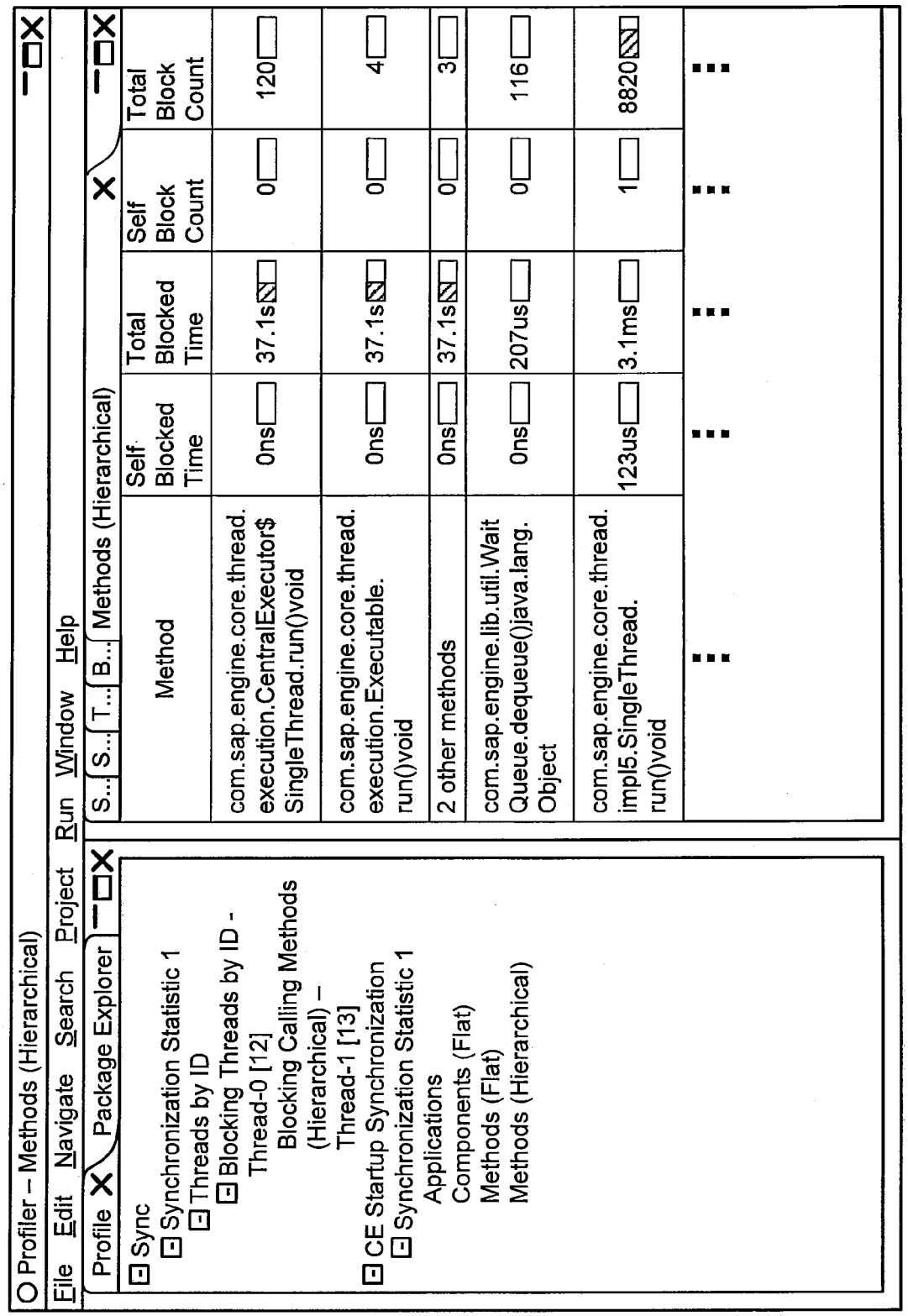
FIG. 18 is a screenshot of a user interface illustrating an amount of time and a number of times that methods are blocked, according to some embodiments.

FIG. 18 is a screenshot of a user interface illustrating an amount of time and a number of times that methods are blocked, according to some embodiments. FIG. 18 displays the methods in a "hierarchical" view.

Figure 19:
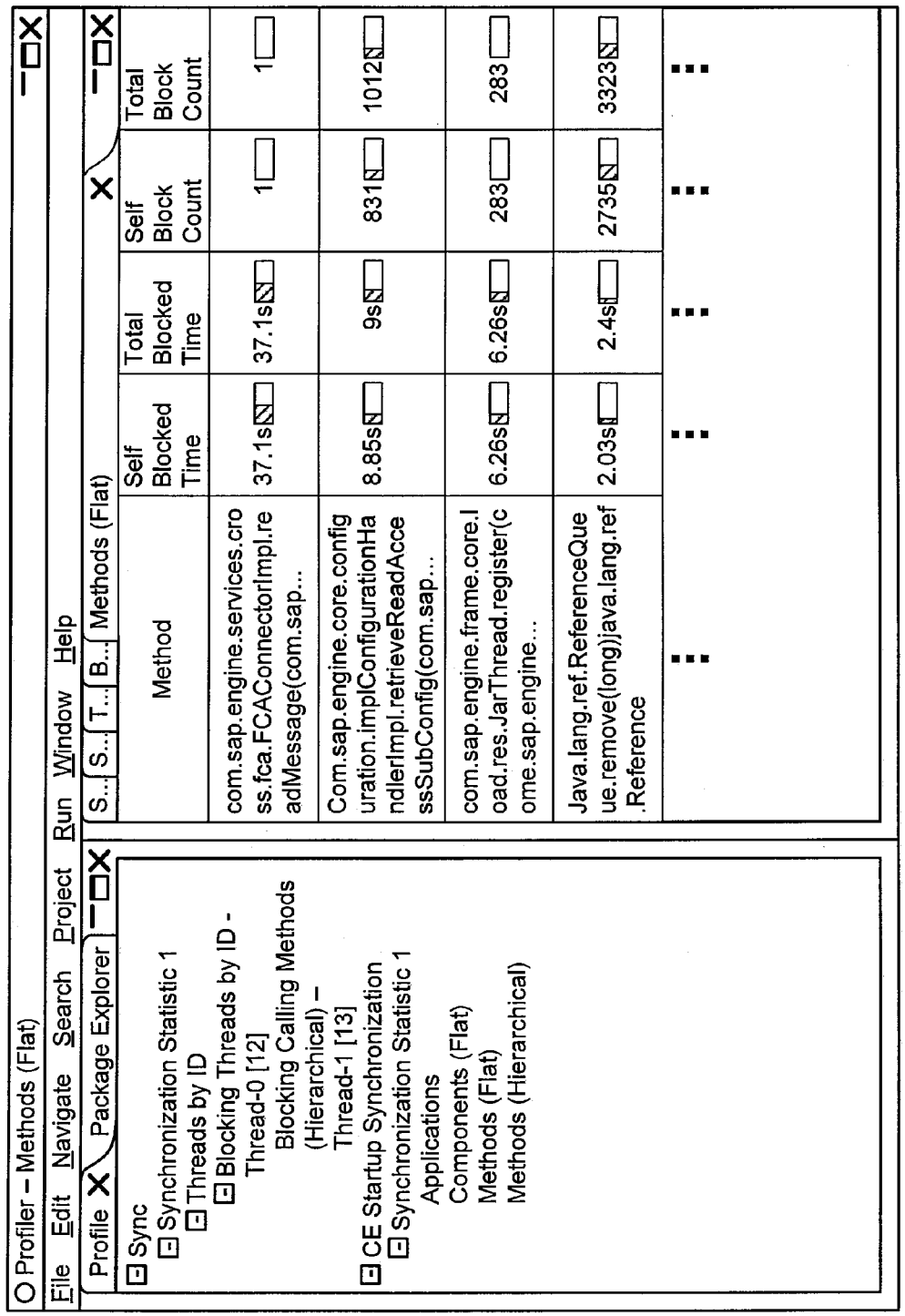
FIG. 19 is another screenshot of a user interface illustrating an amount of time and a number of times that methods are blocked, according to some embodiments.

FIG. 19 is another screenshot of a user interface illustrating an amount of time and a number of times that methods are blocked, according to some embodiments. FIG. 19 displays the methods in a "flat" (e.g., non-hierarchical) view.

Figure 20:
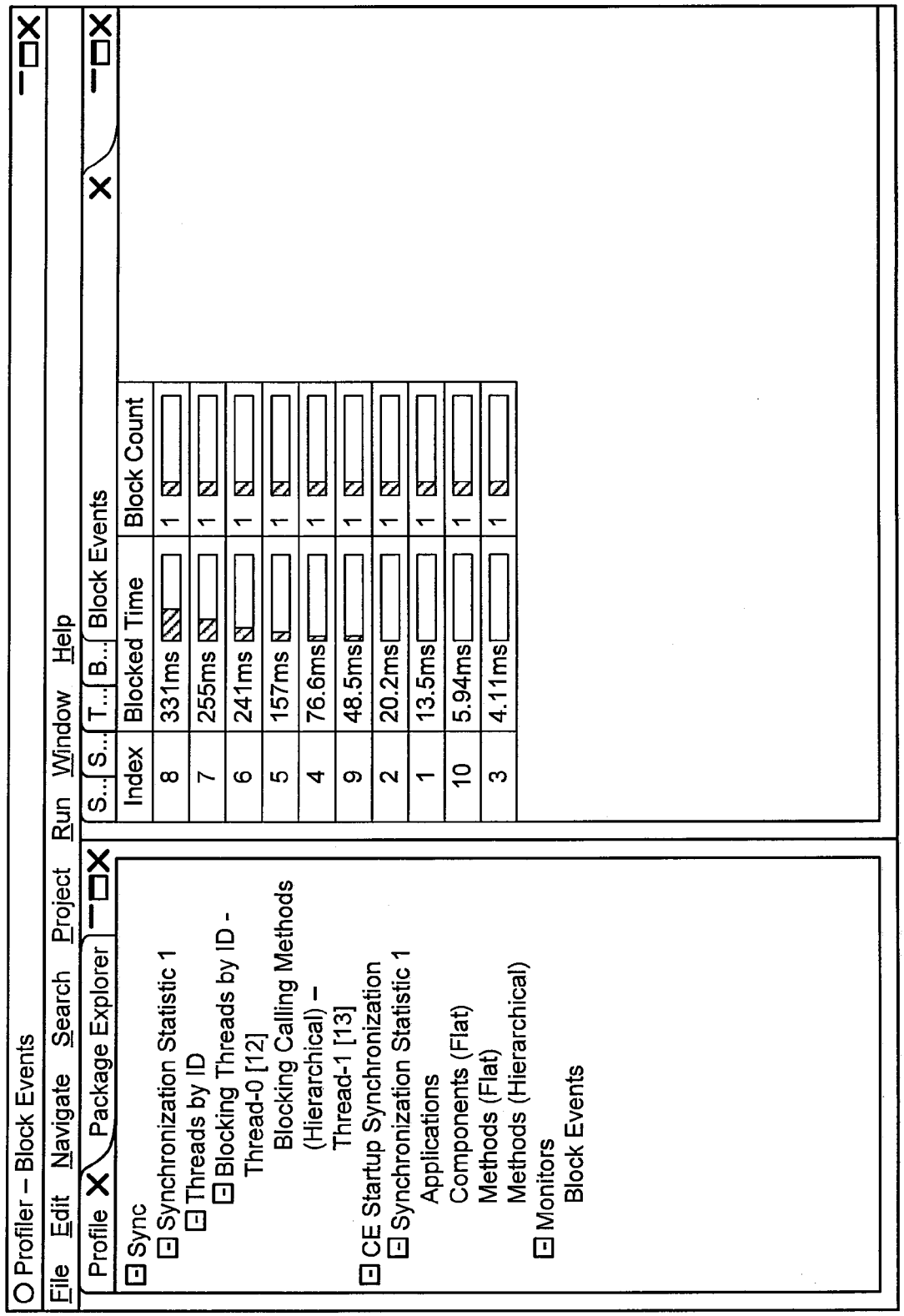
FIG. 20 is a screenshot of a user interface illustrating an amount of time and a number of times that synchronization primitives blocked threads, according to some embodiments.

FIG. 20 is a screenshot of a user interface illustrating an amount of time and a number of times that synchronization primitives blocked threads, according to some embodiments.

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 400) or one or more hardware modules of a computer system (e.g., a processor 602 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 602 configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 602 that are temporarily configured (e.g., by software, code, and/or instructions stored in a machine-readable medium) or permanently configured to perform the relevant operations. Whether temporarily or permanently configured, such processors 602 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 602 or processor-implemented (or computer-implemented) modules. Similarly, at least some of the operations of a method may be governed by instructions that are stored in a computer readable storage medium and executed by one or more processors 602 or processor-implemented (or computer-implemented) modules. The performance of certain of the operations may be distributed among the one or more processors 602, not only residing within a single machine, but deployed across a number of machines. In some example embodiments, the processors 602 may be located in a single location (e.g., within a home environment, an office environment or as a server farm), while in other embodiments the processors 602 may be distributed across a number of locations.

While the embodiment(s) is (are) described with reference to various implementations and exploitations, it will be understood that these embodiments are illustrative and that the scope of the embodiment(s) is not limited to them. In general, techniques for identifying contention of shared resources in a runtime system may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A computer-implemented method of determining a runtime of a thread of an application, the method comprising:
   receiving synchronization events for a first thread of an application executing on a computer system, the synchronization events including at least a first synchronization event and a second synchronization event for the first thread, each synchronization event includes a synchronization event timestamp corresponding to a time at which the synchronization event occurred and an accumulated timestamp corresponding to a time during which a runtime system of the computer system has been executing runtime system operations that include generating at least one stack trace of the first thread;
   calculating a first difference between the synchronization event timestamp of the first synchronization event and the synchronization event timestamp of the second synchronization event;
   calculating a second difference between the accumulated timestamp of the first synchronization event and the accumulated timestamp of the second synchronization event;
   calculating, by at least one processor of a computer system, a runtime of the first thread of the application as a difference between the first difference and the second difference;
   providing a first user interface that displays a synchronization snapshot, the synchronization snapshot including a plurality of statistics selections that each causes a different type of display of statistics;
   in response to a threads-by-identifier selection of the plurality of statistics selections, providing a second user interface that displays a list of threads including the first thread and corresponding blocking information for each thread in the list, the corresponding blocking information including an identifier of each thread, a blocked time for each thread, and a block count for each thread; and
   receiving a selection of a thread from the list of threads, the selection causing presentation of a third user interface including additional blocking statistics for only the selected thread, the additional blocking statistics including a number of times that one or more other threads blocked the selected thread, an identifier for each of the one or more other threads, and a blocked time for each of the one or more other threads.

2. The method of claim 1, wherein a respective synchronization event is selected from the group consisting of:
   an enter event corresponding to a time when the first thread attempts to enter a critical section by requesting use of a synchronization primitive;
   an entered event corresponding to a time when the first thread enters the critical section by acquiring use of the synchronization primitive; and
   an exit event corresponding to a time when the first thread exits the critical section by releasing use of the synchronization primitive.

3. The method of claim 2, wherein the synchronization primitive is selected from the group consisting of:
   a mutex;
   an object monitor;
   a lock;
   a cyclic barrier; and
   a latch.

4. The method of claim 2, wherein the first synchronization event is an enter event and the second synchronization event is an entered event, and wherein the method further comprises identifying the second thread that blocked the first thread.

5. The method of claim 4, further comprising:
   determining a number of times that the synchronization primitive used by the second thread blocked the first thread; and
   displaying, in a further user interface, the number of times that the synchronization primitive used by the second thread blocked the first thread.

6. The method of claim 2, further comprising incrementing an enumerator for the synchronization primitive based on a release of the synchronization primitive that is in an inflated state while refraining from incrementing the enumerator for the release of the synchronization primitive in a deflated state having less than two threads awaiting, the inflated state occurring based on having at least one other thread awaiting use of the synchronization primitive, the deflated state occurring based on at most one thread using the synchronization primitive and no other thread awaiting use of the synchronization primitive.

7. The method of claim 2, wherein the first synchronization event is an enter event and the second synchronization event is an entered event, and wherein the method further comprises identifying a plurality of threads that blocked the first thread.

8. The method of claim 7, wherein identifying the plurality of threads that blocked the first thread includes:
   identifying a first value of a synchronization primitive enumerator for a synchronization primitive corresponding to the enter event for the first thread;

identifying a second value of the synchronization primitive enumerator for the synchronization primitive corresponding to the entered event for the first thread; and identifying threads whose respective exit events have values for synchronization primitive enumerators for the synchronization primitive greater than or equal to the first value and less than or equal to the second value.

9. The method of claim 7, wherein the first thread is the selected thread and the one or more other threads comprise the plurality of threads.

10. The method of claim 7, further comprising determining a number of times that each thread in the plurality of threads blocked the first thread.

11. The method of claim 10, wherein the first thread is the selected thread and the number of times that the one or more other threads blocked the selected thread comprises the number of times that each thread in the plurality of threads blocked the first thread.

12. The method of claim 1, wherein the additional blocking statistics further include:
a name of every blocking thread that has been blocking the selected thread, and
an amount of time each blocking thread has blocked the selected thread.

13. The method of claim 1, further comprising, in response to the receiving the selection of the thread, causing presentation of a further user interface that includes
a list of calling methods that has been blocking the selected thread;
at least one block time for each calling method of the list of calling methods; and
at least one block count for each method of the list of calling methods.

14. The method of claim 1, further comprising displaying, in a further user interface, the runtime of the first thread of the application.

15. The method of claim 1, wherein a respective synchronization event includes stack traces for respective threads associated with the respective synchronization event.

16. A system to determine a runtime of a thread of an application, comprising:
at least one processor;
memory; and
at least one program stored in the memory, the at least one program comprising instructions to perform operations comprising:
receiving synchronization events for a first thread of an application executing on a computer system, the synchronization events including at least a first synchronization event and a second synchronization event for the first thread, each synchronization event includes a synchronization event timestamp corresponding to a time at which the synchronization event occurred and an accumulated timestamp corresponding to a time during which a runtime system of the computer system has been executing runtime system operations that include generating at least one stack trace of the first thread;
calculating a first difference between the synchronization event timestamp of the first synchronization event and the synchronization event timestamp of the second synchronization event;
calculating a second difference between the accumulated timestamp of the first synchronization event and the accumulated timestamp of the second synchronization event;
calculating a runtime of the first thread of the application as a difference between the first difference and the second difference;
providing a first user interface that displays a synchronization snapshot, the synchronization snapshot including a plurality of statistics selections that each causes a different type of display of statistics;
in response to a threads-by-identifier selection of the plurality of statistics selections, providing a second user interface that displays a list of threads including the first thread and corresponding blocking information for each thread in the list, the corresponding blocking information including an identifier of each thread, a blocked time for each thread, and a block count for each thread; and
receiving a selection of a thread from the list of threads, the selection causing presentation of a third user interface including additional blocking statistics for only the selected thread, the additional blocking statistics including a number of times that one or more threads blocked the selected thread, an identifier for each of the one or more other threads, and a blocked time for each of the one or more other threads.

17. The system of claim 16, wherein a respective synchronization event is selected from the group consisting of:
an enter event corresponding to a time when the first thread attempts to enter a critical section by requesting use of a synchronization primitive;
an entered event corresponding to a time when the first thread enters the critical section by acquiring use of the synchronization primitive; and
an exit event corresponding to a time when the first thread exits the critical section by releasing use of the synchronization primitive.

18. The system of claim 17, wherein the synchronization primitive is selected from the group consisting of:
a mutex;
an object monitor;
a lock;
a cyclic barrier; and
a latch.

19. A non-transitory computer readable storage medium storing at least one program configured for execution by a computer, the at least one program comprising instructions to cause a machine to perform operations comprising:
receiving synchronization events for a first thread of an application executing on a computer system, the synchronization events including at least a first synchronization event and a second synchronization event for the first thread, wherein each synchronization event includes a synchronization event timestamp corresponding to a time at which the synchronization event occurred and an accumulated timestamp corresponding to a time during which a runtime system of the computer system has been executing runtime system operations that include generating at least one stack trace of the first thread;
calculating a first difference between the synchronization event timestamp of the first synchronization event and the synchronization event timestamp of the second synchronization event;
calculating a second difference between the accumulated timestamp of the first synchronization event and the accumulated timestamp of the second synchronization event;

calculating a runtime of the first thread of the application as a difference between the first difference and the second difference;

providing a first user interface that displays a synchronization snapshot, the synchronization snapshot including a plurality of statistics selections that each causes a different type of display of statistics;

in response to a threads-by-identifier selection of the plurality of statistics selections, providing a second user interface that displays a list of threads including the first thread and corresponding blocking information for each thread in the list, the corresponding blocking information including an identifier of each thread, a blocked time for each thread, and a block count for each thread; and receiving a selection of a thread from the list of threads, the selection causing presentation of a third user interface including additional blocking statistics for only the selected thread, the additional blocking statistics including a number of times that one or more other threads blocked the selected thread, an identifier for each of the one or more other threads, and a blocked time for each of the one or more other threads.

20. The non-transitory computer readable storage medium of claim 19, wherein a respective synchronization event is selected from the group consisting of:

an enter event corresponding to a time when the first thread attempts to enter a critical section by requesting use of a synchronization primitive;

an entered event corresponding to a time when the first thread enters the critical section by acquiring use of the synchronization primitive; and an exit event corresponding to a time when the first thread exits the critical section by releasing use of the synchronization primitive.

21. The non-transitory computer readable storage medium of claim 20, wherein the synchronization primitive is selected from the group consisting of:

a mutex;
an object monitor;
a lock;
a cyclic barrier; and
a latch.

* * * * *